(12) United States Patent
Lee et al.

(10) Patent No.: US 11,844,141 B2
(45) Date of Patent: Dec. 12, 2023

(54) METHOD AND APPARATUS FOR PROVIDING POLICY OF USER EQUIPMENT IN WIRELESS COMMUNICATION SYSTEM

(71) Applicant: Samsung Electronics Co., Ltd., Gyeonggi-do (KR)

(72) Inventors: Jicheol Lee, Gyeonggi-do (KR); Sangsoo Jeong, Gyeonggi-do (KR); Youngkyo Baek, Gyeonggi-do (KR)

(73) Assignee: Samsung Electronics Co., Ltd

( * ) Notice: Subject to any disclaimer, the term of this patent is extended or adjusted under 35 U.S.C. 154(b) by 72 days.

(21) Appl. No.: 17/642,094

(22) PCT Filed: Aug. 26, 2020

(86) PCT No.: PCT/KR2020/011353
§ 371 (c)(1),
(2) Date: Mar. 10, 2022

(87) PCT Pub. No.: WO2021/049782
PCT Pub. Date: Mar. 18, 2021

(65) Prior Publication Data
US 2022/0386100 A1    Dec. 1, 2022

(30) Foreign Application Priority Data
Sep. 10, 2019  (KR) .................. 10-2019-0112362

(51) Int. Cl.
*H04W 8/06* (2009.01)
*H04M 15/00* (2006.01)
(Continued)

(52) U.S. Cl.
CPC ............ *H04W 8/06* (2013.01); *H04M 15/66* (2013.01); *H04W 8/04* (2013.01); *H04W 84/042* (2013.01)

(58) Field of Classification Search
CPC ....... H04W 8/06; H04W 8/04; H04W 84/042; H04M 15/66
(Continued)

(56) References Cited

U.S. PATENT DOCUMENTS

2015/0063301 A1    3/2015  Faccin
2019/0116520 A1*   4/2019  Chaponniere ........... H04W 4/20
(Continued)

FOREIGN PATENT DOCUMENTS

WO    WO 2019/194633    10/2019

OTHER PUBLICATIONS

Lenovo, Motorola Mobility, UE Policy Configuration (23.503), S2-177244, SA WG2 Meeting #123, Oct. 23-27, 2017, 7 pages.
(Continued)

*Primary Examiner* — Obaidul Huq
(74) *Attorney, Agent, or Firm* — The Farrell Law Firm, P.C.

(57) ABSTRACT

Provided are a method and apparatus for providing a policy of a user equipment in a wireless communication system, and an operating method of a visited-policy control function (V-PCF) of a visited public land mobile network (PLMN) providing a policy for processing traffic of a user equipment in a wireless communication system, the operating method includes: transmitting an indicator requesting transmission or allowance of transmission of a visited user equipment route selection policy (V-URSP) of the V-PCF to a home-policy control function (H-PCF) of a home PLMN; receiving, from the H-PCF, an indicator indicating whether transmission of the V-URSP of the V-PCF is allowed; and receiving a home user equipment route selection policy (H-URSP) from the H-PCF.

15 Claims, 10 Drawing Sheets

(51) Int. Cl.
  *H04W 8/04* (2009.01)
  *H04W 84/04* (2009.01)
(58) Field of Classification Search
  USPC .......................................... 370/310, 328, 329
  See application file for complete search history.

(56) References Cited

U.S. PATENT DOCUMENTS

2019/0268835 A1   8/2019  Shan et al.
2020/0304983 A1*  9/2020  Zhu ....................... H04W 36/00
2021/0037380 A1   4/2021  Lee et al.

OTHER PUBLICATIONS

Ericsson et al., "TS 23.501: Clean Up of PCF and Reference Point Names for PCC", S2-173792, SA WG2 Meeting #121, May 15-19, 2017, 28 pages.
LG Electronics, "URSP Rule and ATSSS Rule", S2-183581, SA WG2 Meeting #127, Apr. 16-20, 2018, 4 pages.
3GPP TS 23.503 V0.5.0, 3rd Generation Partnership Project; Technical Specification Group Services and System Aspects; Policy and Charging Control Framework for the 5G System; Stage 2 (Release 15), Dec. 2017, 56 pages.
Oppo, "Clarification of Applicability of UE Policy to PLMNs", S2-1908159, SA WG2 Meeting #134, Jun. 24-28, 2019, 5 pages.
Samsung, "Overriding User Preference Indication in URSP", S2-183186, 3GPP TSG SA WG2 Meeting #127, Apr. 16-20, 2018, 5 pages.
3GPP TS 29.507 V15.0.0, 3rd Generation Partnership Project; Technical Specification Group Core Network and Terminals; 5G System; Access and Mobility Policy Control Service; Stage 3 (Release 15), Jun. 2018, 34 pages.
European Search Report dated Nov. 18, 2022 issued in counterpart application No. 20862752.1-1216, 20 pages.
European Search Report dated Aug. 29, 2022 issued in counterpart application No. 20862752.1-1216, 17 pages.
International Search Report dated Nov. 25, 2020 issued in counterpart application No. PCT/KR2020/011353, 3 pages.
Written Opinion dated Nov. 25, 2020 issued in counterpart application No. PCT/KR2020/011353, 8 pages.
ETSI TS 123 503 V15.5.0 (Apr. 2019), 5G; Policy and charging control framework for the 5G System (5GS); Stage 2 (3GPP TS 23.503 version 15.5.0 Release 15), 85 pages.
LG Electronics, 3GPP TSG-SA WG2 Meeting #126 S2-181499 Montreal, Canada, Feb. 26-Mar. 2, 2018, "Clarification on PCF interaction", 6 pages.
Qualcomm Incorporated, 3GPP TSG-CT WG1 Meeting #119 C1-194400 Wroclaw (Poland), Aug. 26-30, 2019, "Handling of PDU session type in matching URSP rule not supported by VPLMN", 6 pages.
Samsung, 3GPP TSG SA WG2 Meeting #127 S2-183186 Apr. 16-20, 2018, Sanya, China, "Overriding user preference indication in URSP", 7 pages.

* cited by examiner

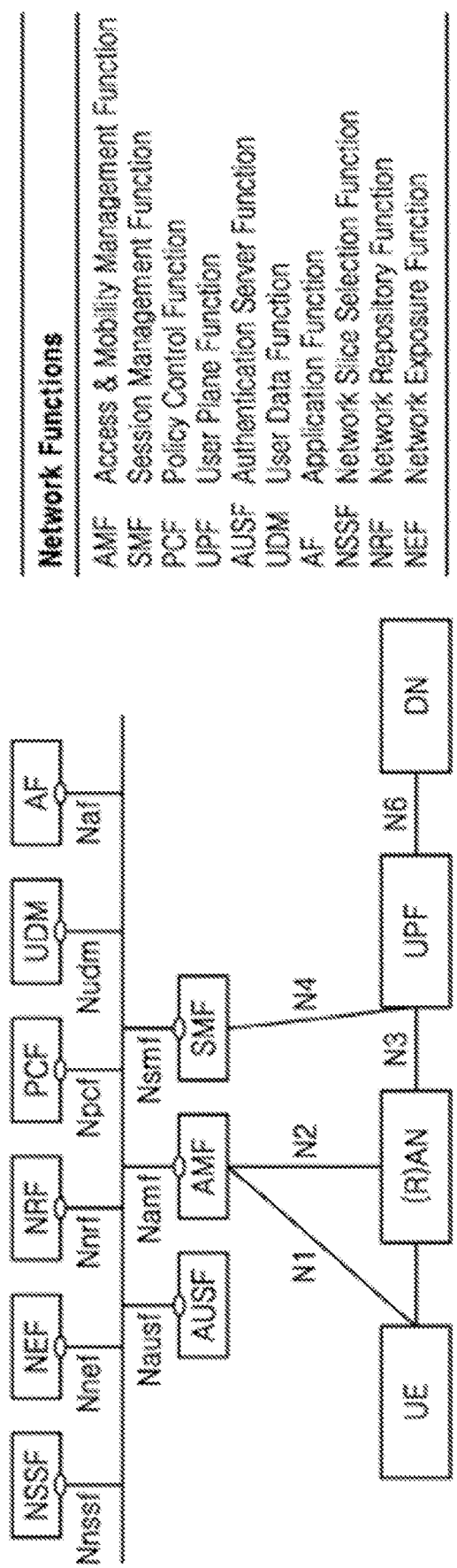
[Fig. 1]

[Fig. 2]
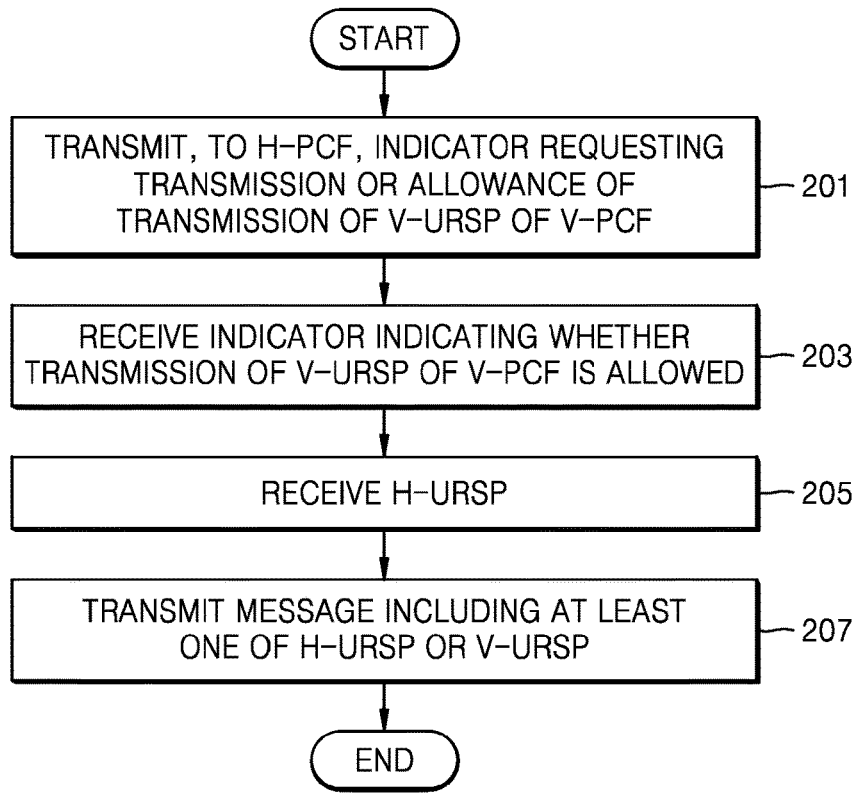
[Fig. 3]
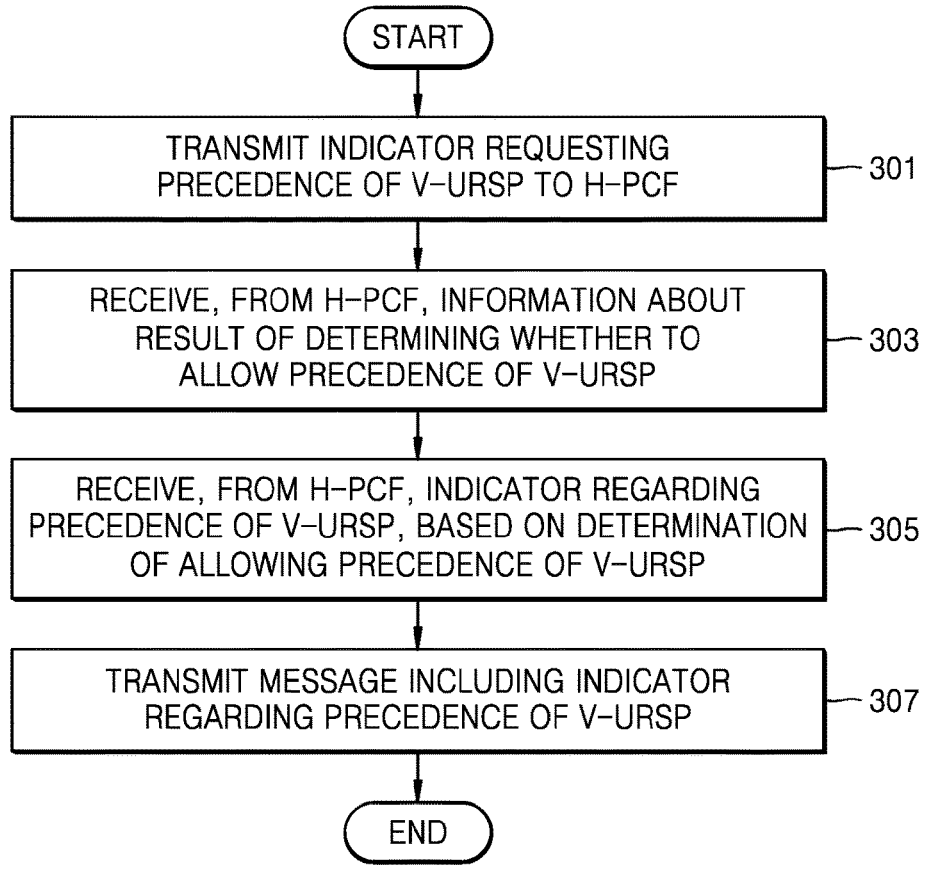

[Fig. 4]
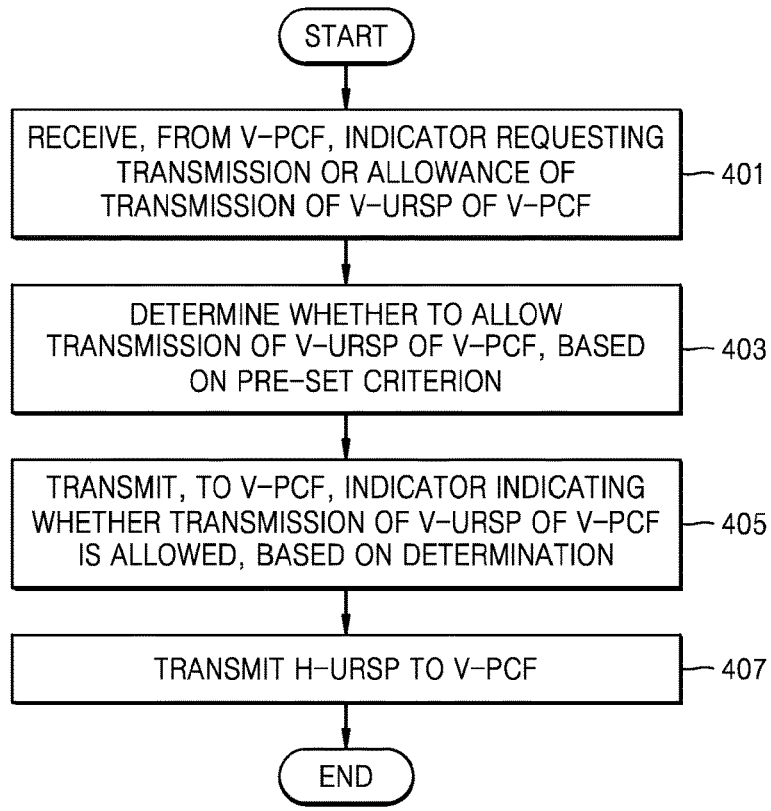
[Fig. 5]
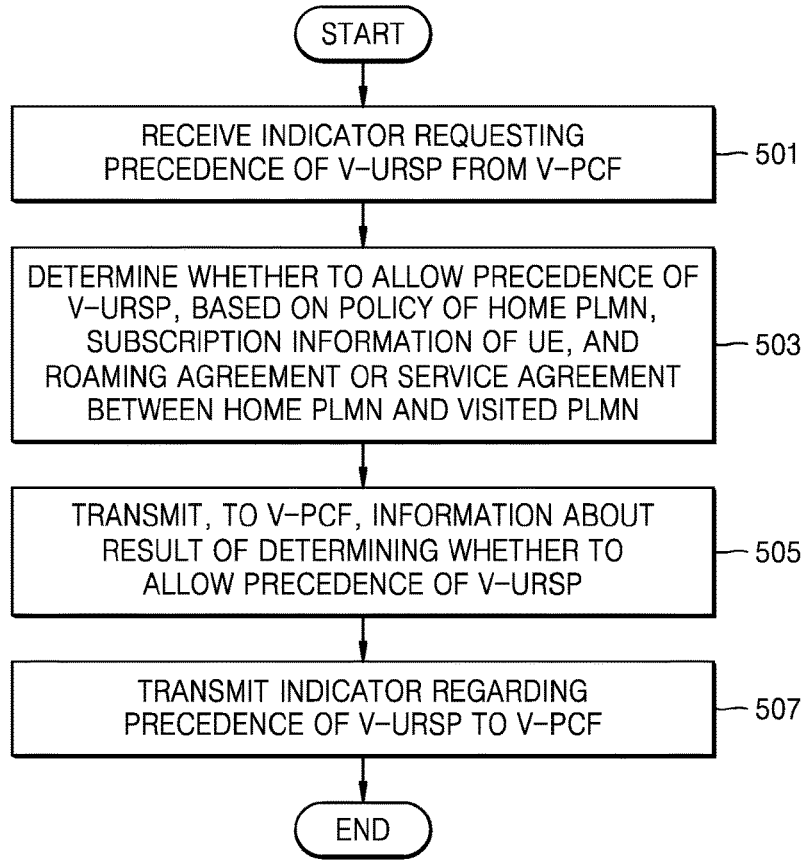

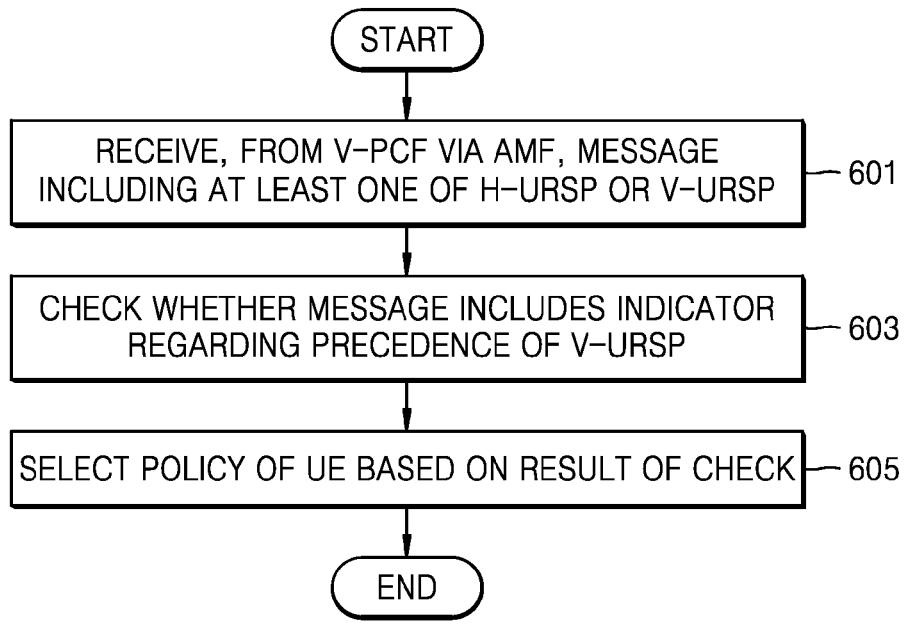
[Fig. 6]

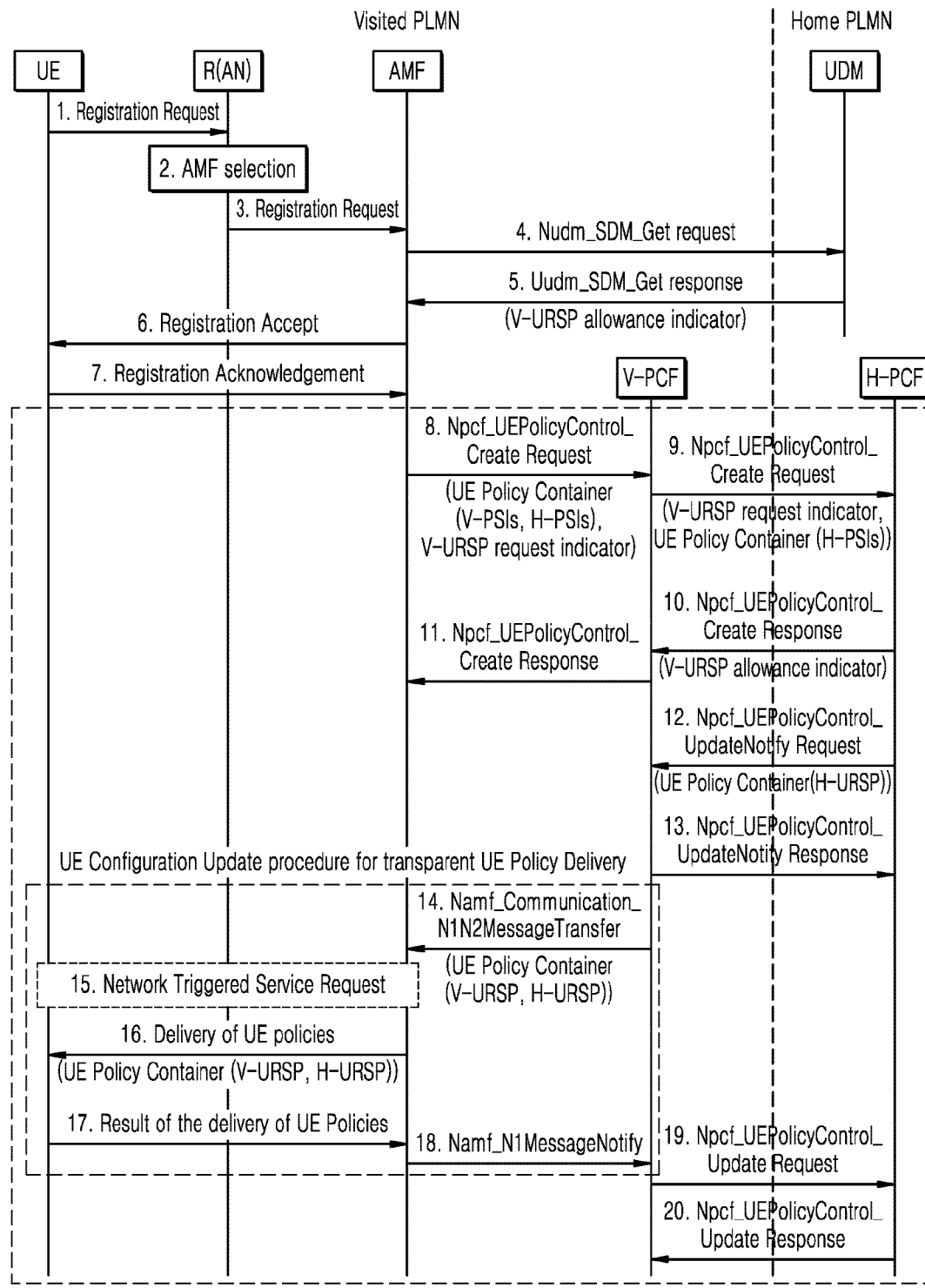
[Fig. 7]

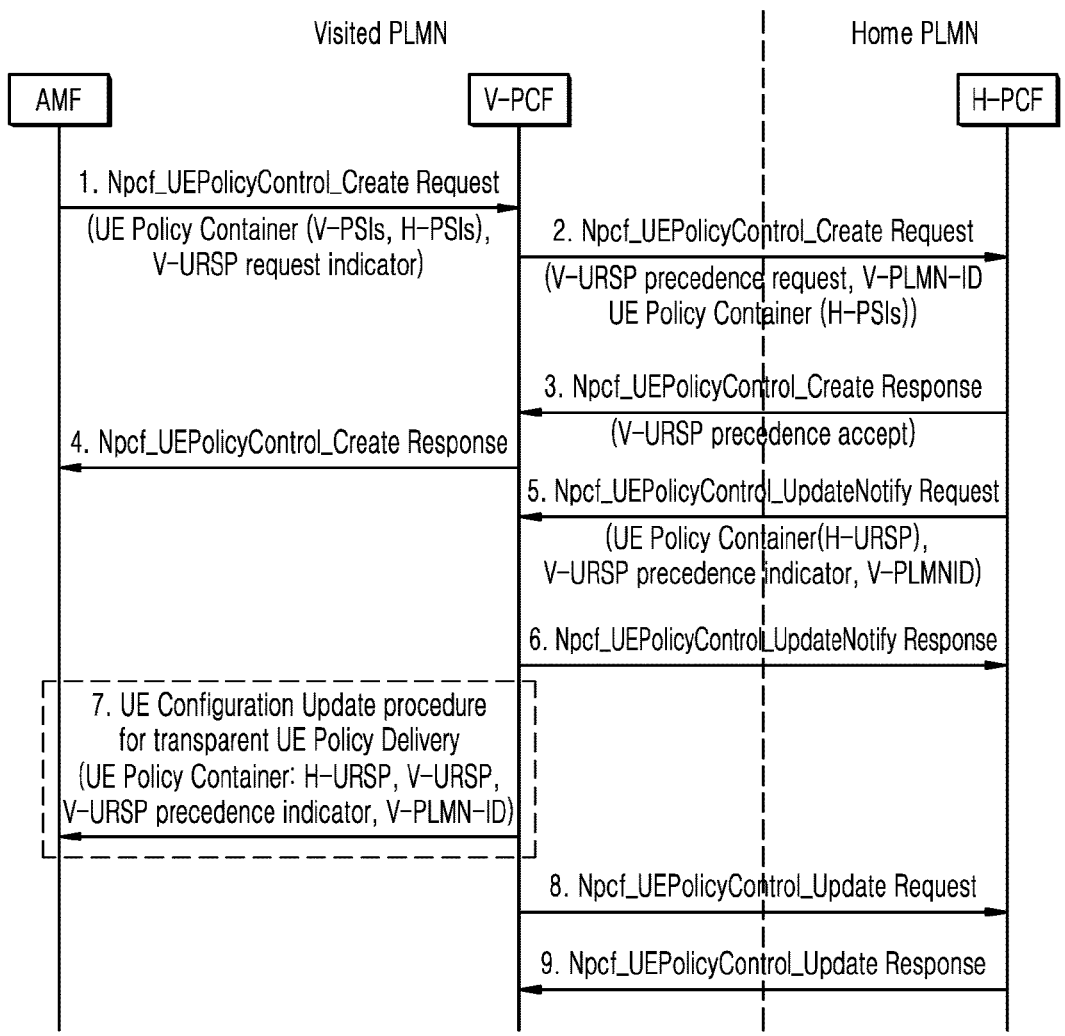

[Fig. 9]
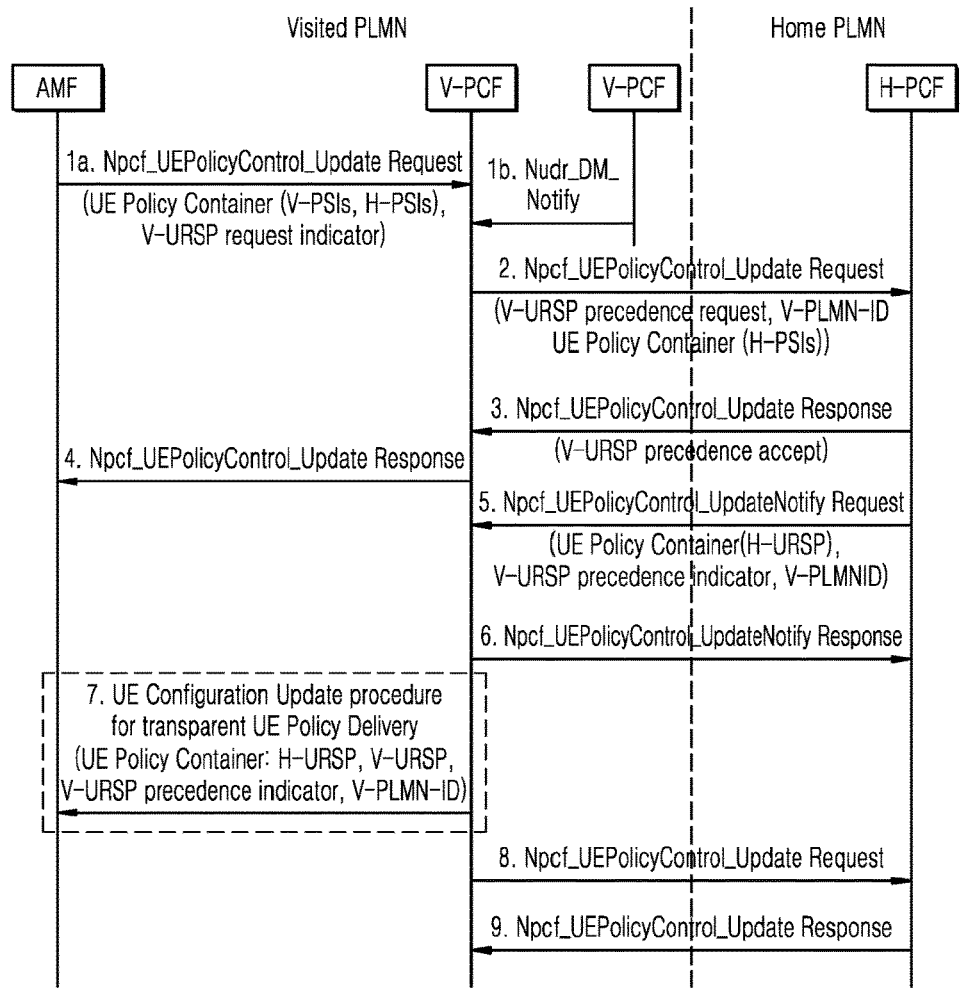
[Fig. 10]
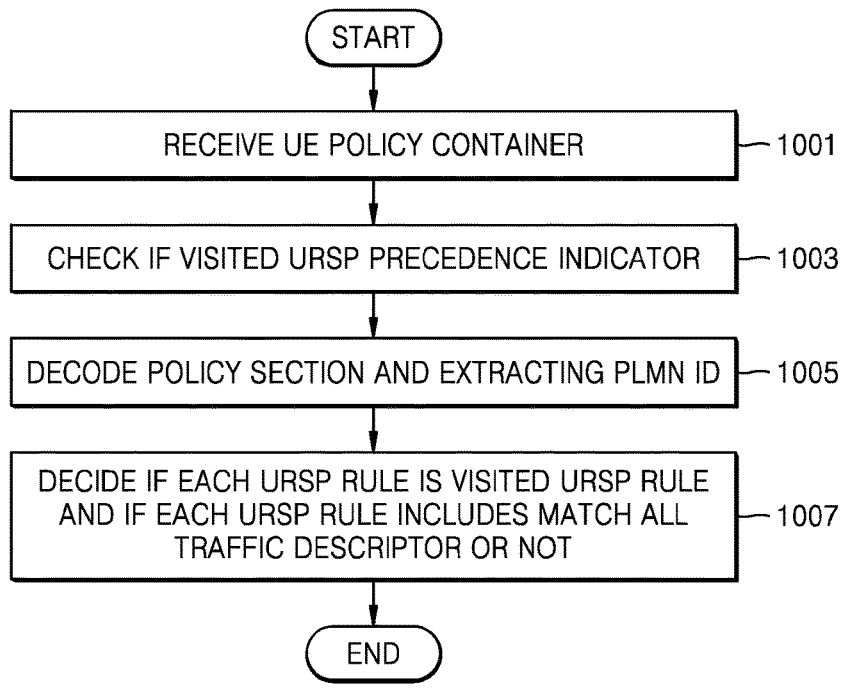

[Fig. 11]
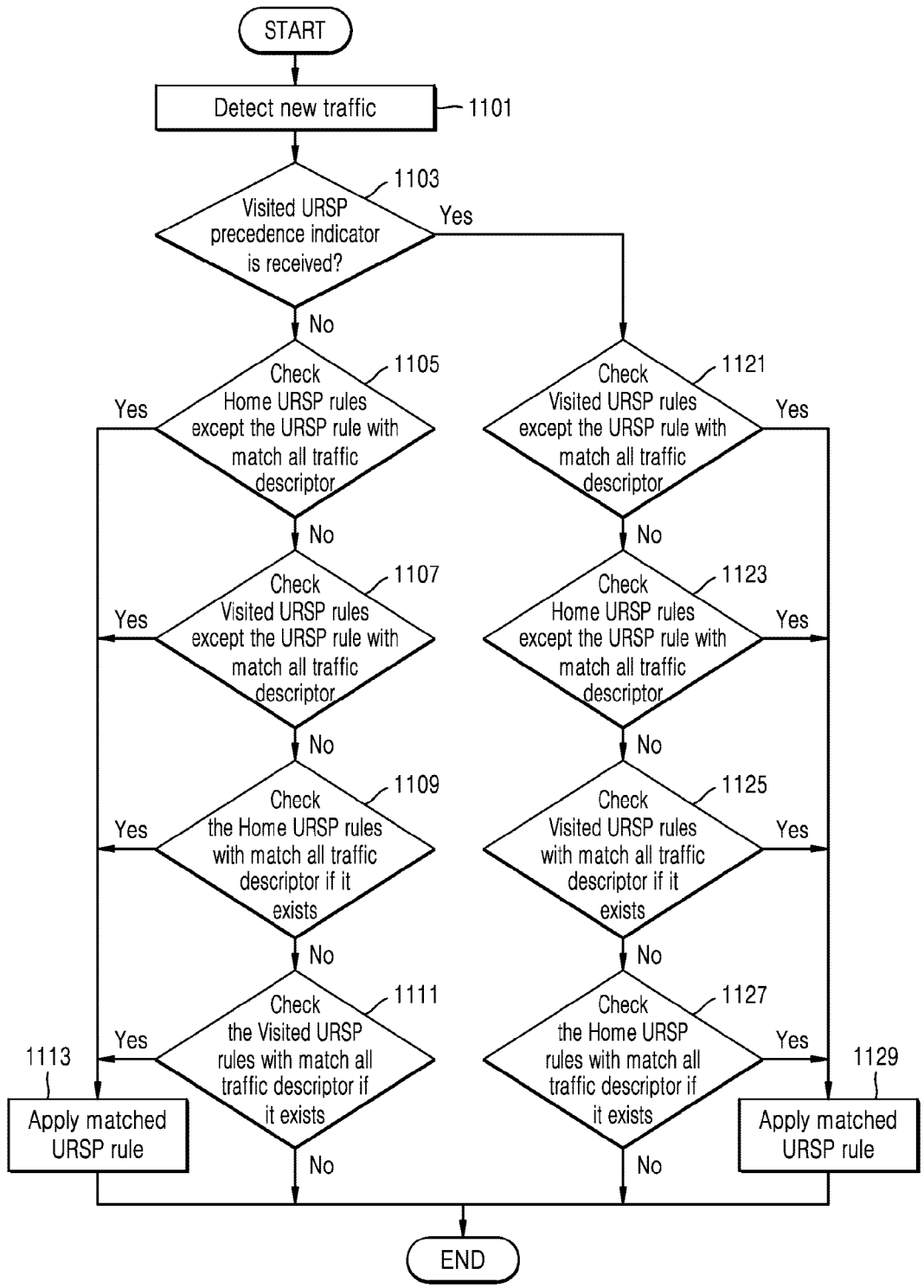

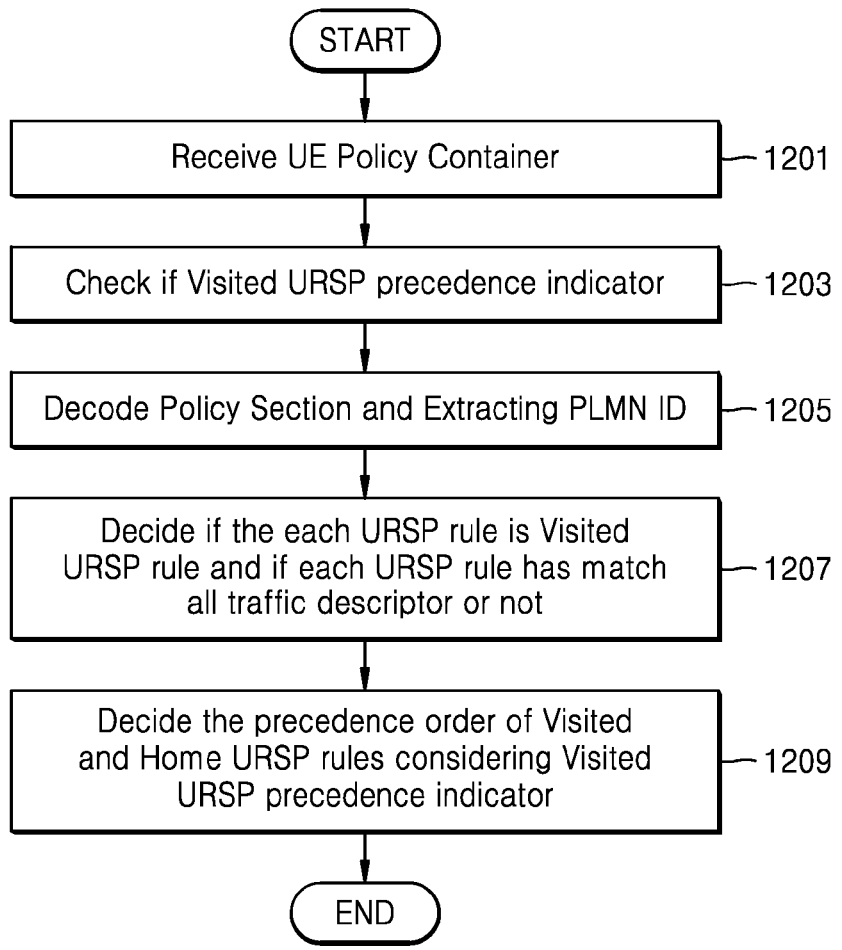
[Fig. 12]

[Fig. 13]
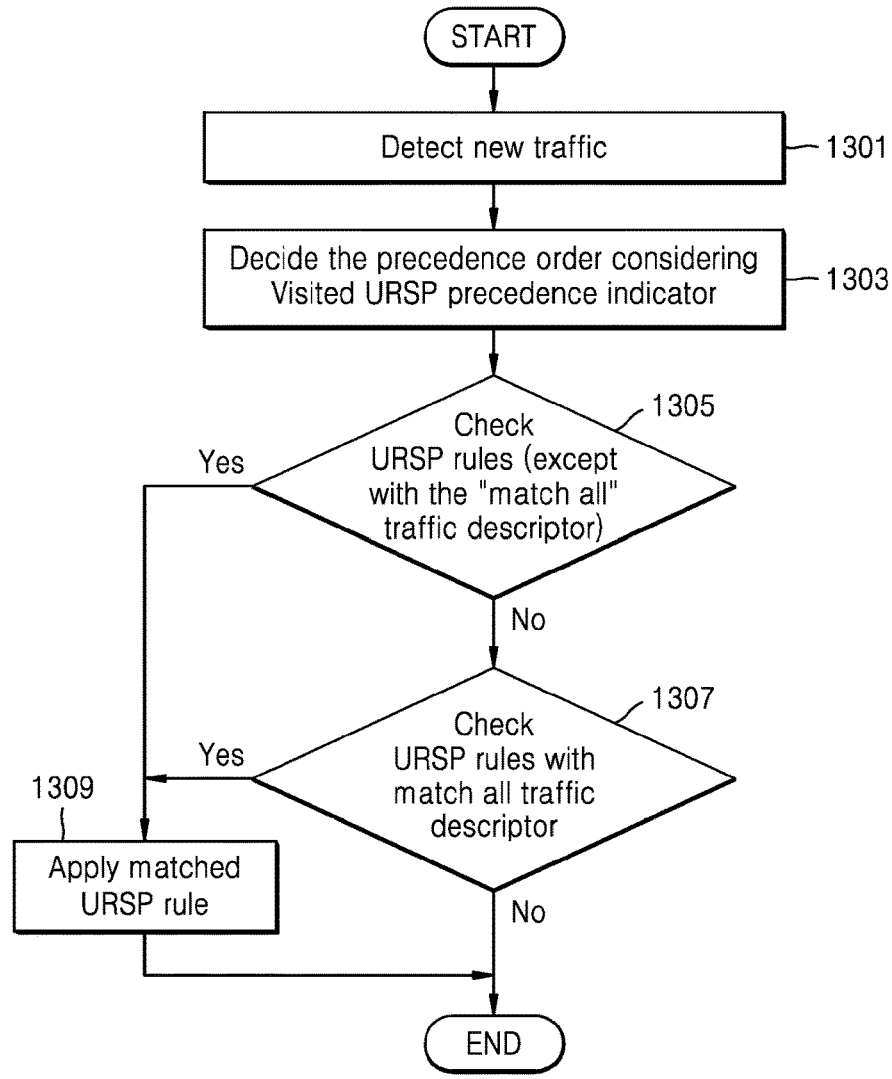
[Fig. 14]
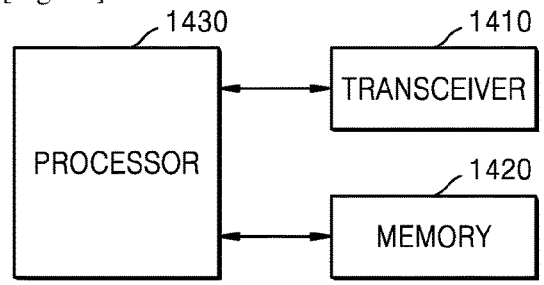
[Fig. 15]
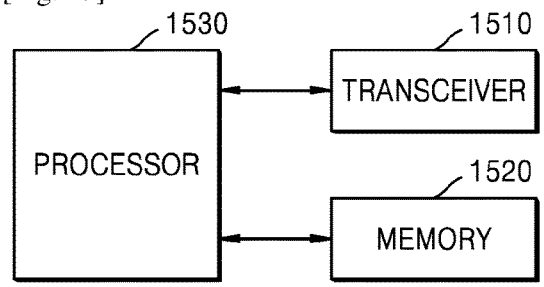

METHOD AND APPARATUS FOR PROVIDING POLICY OF USER EQUIPMENT IN WIRELESS COMMUNICATION SYSTEM

PRIORITY

This application is a National Phase Entry of PCT International Application No. PCT/KR2020/011353, which was filed on Aug. 26, 2020, and claims priority to Korean Patent Application No. 10-2019-0112362, which was filed on Sep. 10, 2019, the entire content of each of which is incorporated herein by reference.

TECHNICAL FIELD

The disclosure relates to a wireless communication system, and more particularly, to a method and apparatus for providing a policy of a user equipment in a wireless communication system.

BACKGROUND ART

To meet the increase in demand for wireless data traffic after the commercialization of $4^{th}$ generation (4G) communication systems, considerable efforts have been made to develop improved $5^{th}$ generation (5G) communication systems or pre-5G communication systems. This is one reason why '5G communication systems' or 'pre-5G communication systems' are called 'beyond 4G network communication systems' or 'post Long-Term Evolution (LTE) systems.'

In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas.

In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation.

Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

3G generation partnership project (3GPP) that is in charge of cellular mobile communication standards has named and is standardizing a new core network structure as a 5G core (5GC) to pursue the evolution from the existing 4G LTE system to a 5G communication system.

5GC supports following differentiated functions compared to an evolved packet core (EPC) that is a network core for the existing 4G communication system.

First, a network slice function is introduced to 5GC. 5GC needs to support various types of user equipments (UEs) and services as requirements of the 5G communication system, such as an enhanced mobile broadband (eMBB), an ultra reliable low latency communications (URLLC), and a massive machine type communications (mMTC). Such UEs/services have different requirements for each core network. For example, in the eMBB service, a high data rate is required and in the URLLC service, high stability and low latency are required. A technology proposed to satisfy various service requirements is a network slice.

The network slice refers to a method of providing several logical networks by virtualizing one physical network, and network slice instances (NSIs) may have different characteristics. Thus, various service requirements may be satisfied because the respective NSIs have network functions (NFs) that match the characteristics. Various 5G communication services may be efficiently supported by assigning NSI depending on characteristics of a service requested by each UE.

Second, 5GC may easily support a network virtualization paradigm by separating a mobility management function and a session management function. In the existing 4G LTE system, all UEs may receive a service in a network via signaling exchange with single core equipment called a mobility management entity (MME) that is in charge of registration, authentication, mobility management, and session management functions. However, in the 5G communication system, the number of UEs has tremendously increased and the mobility and traffic/session characteristics, which need to be supported depending on a type of UE, have subdivided, and thus scalability of adding entities for each required function when single equipment such as MME supports all functions is bound to decrease. Accordingly, various functions are being developed based on a structure of separating the mobility management function and the session management function to improve the scalability in terms of a signaling load and function/implementation complexity of the core equipment that is in charge of a control plane.

As described above, various services may be provided due to the development of wireless communication systems, and thus there is need for methods of smoothly providing such services.

DISCLOSURE OF INVENTION

Solution to Problem

Provided are a method and apparatus for providing a policy of a user equipment (UE) in a wireless communication system.

Also, provided are a method and apparatus by which a visited network operator provides a UE route selection policy (URSP) to a UE.

Also, provided are a method and apparatus by which a visited network operator provides an indicator regarding an order of precedence of URSP to a UE.

Additional aspects will be set forth in part in the description which follows and, in part, will be apparent from the description, or may be learned by practice of the presented embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 illustrates a network structure and interface of a 5$^{th}$ generation (5G) system, according to an embodiment of the disclosure;

FIG. 2 is a flowchart of a method by which a visited-policy control function (V-PCF) transmits a visited user equipment route selection policy (V-URSP), according to an embodiment of the disclosure;

FIG. 3 is a flowchart of a method by which a V-PCF transmits a precedence indicator related to a V-URSP, according to an embodiment of the disclosure;

FIG. 4 is a flowchart of a method by which a home-policy control function (H-PCF) determines transmission of a V-URSP of a V-PCF, according to an embodiment of the disclosure;

FIG. 5 is a flowchart of a method by which a H-PCF transmits a precedence indicator related to a V-URSP, according to an embodiment of the disclosure;

FIG. 6 is a flowchart of a method by which a user equipment (UE) selects a policy of the UE, according to an embodiment of the disclosure;

FIG. 7 is a sequence diagram of a method of transmitting a V-URSP, according to an embodiment of the disclosure;

FIG. 8 is a sequence diagram of a method of transmitting a precedence indicator related to a V-URSP, according to an embodiment of the disclosure;

FIG. 9 is a sequence diagram of a method of transmitting a precedence indicator related to a V-URSP, according to another embodiment of the disclosure;

FIG. 10 is a flowchart of an operating method of a UE that received a message related to a policy, according to an embodiment of the disclosure;

FIG. 11 is a flowchart of an operating method of a UE when new traffic is detected, according to an embodiment of the disclosure;

FIG. 12 is a flowchart of an operating method of a UE that received a message related to a policy, according to an embodiment of the disclosure;

FIG. 13 is a flowchart of an operating method of a UE when new traffic is detected, according to an embodiment of the disclosure;

FIG. 14 is a block diagram of a configuration of a UE, according to an embodiment of the disclosure; and FIG. 15 is a block diagram of a configuration of a core network entity, according to an embodiment of the disclosure.

MODE FOR THE INVENTION

According to an embodiment of the disclosure, an operating method of a visited-policy control function (V-PCF) of a visited public land mobile network (PLMN) providing a policy for processing traffic of a user equipment in a wireless communication system includes: transmitting an indicator requesting transmission or allowance of transmission of a visited user equipment route selection policy (V-URSP) of the V-PCF to a home-policy control function (H-PCF) of a home PLMN; receiving, from the H-PCF, an indicator indicating whether transmission of the V-URSP of the V-PCF is allowed; receiving a home user equipment route selection policy (H-URSP) from the H-PCF; and transmitting, to the user equipment via an access and mobility management function (AMF), a message including at least one of the H-URSP or the V-URSP, based on the indicator indicating whether the transmission of the V-URSP of the V-PCF is allowed.

According to another embodiment of the disclosure, an operating method of a home-policy control function (H-PCF) of a home public land mobile network (PLMN) providing a policy for processing traffic of a user equipment in a wireless communication system includes: receiving, from a visited-PCF (V-PCF) of a visited PLMN, an indicator requesting transmission or allowance of transmission of a visited user equipment route selection policy (V-URSP) of the V-PCF; determining, based on a pre-set criterion, whether to allow transmission of the V-URSP of the V-PCF; transmitting, to the V-PCF, an indicator indicating whether the transmission of the V-URSP of the V-PCF is allowed, based on a result of the determining; and transmitting a home-URSP (H-URSP) to the V-PCF.

According to another embodiment of the disclosure, an operating method of a user equipment for providing a policy for processing traffic of the user equipment in a wireless communication system includes: receiving a message including at least one of home user equipment route selection policy (H-URSP) or a visited-URSP (V-URSP) from a visited-policy control function (V-PCF) of a visited public land mobile network (PLMN) via a mobility management function (AMF); checking whether the message includes an indicator regarding precedence of the V-URSP; and selecting a policy of the user equipment based on a result of the checking, wherein the precedence of the V-URSP indicates that the V-URSP has a higher order of precedence than the H-URSP when a policy of the user equipment is selected.

According to another embodiment of the disclosure, a visited-policy control function (V-PCF) of a visited public land mobile network (PLMN) providing a policy for processing traffic of a user equipment in a wireless communication system includes: a transceiver; a memory; and at least one processor configured to: transmit, to a home-PCF (H-PCF) of a home PLMN, an indicator requesting transmission or allowance of transmission of a visited-user equipment route selection policy (V-URSP) of the V-PCF; receive, from the H-PCF, an indicator indicating whether transmission of the V-URSP of the V-PCF is allowed; receive a home-URSP (H-URSP) from the H-PCF; and transmit, to the user equipment via an access and mobility management function (AMF), a message including at least one of the H-URSP or the V-URSP, based on the indicator indicating whether the transmission of the V-URSP of the V-PCF is allowed.

According to another embodiment of the disclosure, a home-policy control function (H-PCF) of a home public land mobile network (PLMN) providing a policy for processing traffic of a user equipment in a wireless communication system includes: a transceiver; a memory; and at least one processor configured to: receive, from a visited-PCF (V-PCF) of a visited PLMN, an indicator requesting transmission or allowance of transmission of a visited user equipment route selection policy (V-URSP) of the V-PCF; determine, based on a pre-set criterion, whether to allow transmission of the V-URSP of the V-PCF; transmit, to the V-PCF, an indicator indicating whether the transmission of the V-URSP of the V-PCF is allowed, based on a result of the determination; and transmit home-URSP (H-URSP) to the V-PCF.

According to another embodiment of the disclosure, a user equipment for providing a policy for processing traffic of the user equipment in a wireless communication system includes: a transceiver; a memory; and at least one processor configured to: receive a message including at least one of home user equipment route selection policy (H-URSP) or a visited-URSP (V-URSP) from a visited-policy control function (V-PCF) of a visited public land mobile network (PLMN) via a mobility management function (AMF); check whether the message includes an indicator regarding precedence of the V-URSP; and select a policy of the user equipment based on a result of the check, wherein the precedence of the V-URSP indicates that the V-URSP has a higher order of precedence than the H-URSP when the policy of the user equipment is selected.

Hereinafter, embodiments of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the 3rd Generation Partnership Project Long Term Evolution (3GPP LTE) standard and the 3GPP new radio (NR) standard. However, the disclosure is not limited by such terms and names, and may be equally applied to systems conforming to other standards. In the disclosure, an evolved node B (eNB) will be used interchangeably with a next generation node B (gNB) for convenience of description. In other words, a base station described as an eNB may also indicate a gNB. Also, the term 'terminal' may indicate not only mobile phones, narrow band-Internet of Things (NB-IoT) devices, and sensors, but also other wireless communication devices.

Hereinafter, a base station (BS) is an entity that assigns resources of a terminal, and may be at least one of a gNode B (gNB), an eNode B (eNB), a Node B (NB), a wireless access unit, a BS controller, or a node on a (radio) access network ((R)AN) or a network. The disclosure is not limited to the above examples.

The disclosure relates to a method and apparatus by which a visited network operator provides a UE route selection policy (URSP) to a UE in a roaming environment.

The disclosure relates to a method and apparatus for transmitting a policy of a UE to the UE and executing the policy in a cellular wireless communication system such as a 5G system.

In a 3GPP Rel-15/Rel-16 system, only a home-policy control function of a home network operator transmits a URSP to a UE. Also, in a roaming situation, a valid URSP rule may be provided in a visited public land mobile network (PLMN) that has signed a roaming agreement with a home network where H-PCF is present. However, there may be a case where different URSP rules are required for a same application in different visited PLMNs. For example, different URSP rules may be provided for a video reproducing application (for example, Netflix) where a visited PLMN (V-PLMN) and a home PLMN (H-PLMN) are the same.

For example, the visited PLMN and the home PLMN may have an indicator (traffic descriptor) indicating a same video reproducing application. However, route selection components of the visited PLMN and home PLMN may be different from each other. For example, the visited PLMN may include, as route selection components, data network name (DNN)1 and single network slice selection assistance information (S-NSSAI)1, and the home PLMN may include, as route selection components, DNN2 and S-NSSAI2. Here, a protocol data unit (PDU) session type of the visited PLMN may be Internet protocol version 4 (IPV4) and a PDU session type of the home PLMN may be IPV6.

Also, a service level agreement (SLA) may require a method of dynamically changing a URSP rule when a rule regarding a service is dynamically changed. For example, a case where the rule regarding a service is dynamically changed includes a case where a URSP rule (for example, a DNN, a session and service continuity (SSC) mode, and S-NSSAI) is changed in relation to a local area data network (LADN) or edge computing. When the dynamic change of the rule regarding a service occurs in a visited operator network, a method of dynamically changing a URSP rule of visited PLMN via a V-PCF may be required.

According to the disclosure, the visited network operator may transmit the policy of UE to the UE via an access and mobility management function (AMF) from the V-PCF while the UE is roaming. According to the disclosure, the visited network operator may transmit, to the UE, the URSP rule of the visited network operator, which dynamically changes.

According to the disclosure, when the URSP rule of the visited network operator and a URSP rule of a home network operator conflict in the UE, an order or precedence agreed between the visited network operator and the home network operator or an order of precedence determined by the home network operator may be transmitted to the UE. When the URSP rules are received from both the home network operator and the visited network operator, the UE may determine while rule to apply first.

FIG. 1 illustrates a network structure (or a network architecture) and interface of a 5G system, according to an embodiment of the disclosure.

Referring to FIG. 1, the network structure of the 5G system may include a UE, an (R)AN, a user plane function (UPF), a data network (DN), an authentication server function (AUSF), an AMF, a session management function (SMF), a network slice selection function (NSSF), a network exposure function (NEF), a network repository function (NRF), a policy control function (PCF), unified data management (UDM), or an application function (AF).

According to an embodiment of the disclosure a UE may denote a terminal. The AMF is a network function for managing mobility of the UE. The SMF is a network function for managing packet data network connection provided to the UE. Such connection may be referred to as a PDU session. The PCF is a network function for applying a service policy, a charging policy, and a PDU session policy of a mobile communication operator on the UE. The UDM is a network function for storing and managing information about a subscriber. The NEF is able to access information for managing the UE in a 5G network, and thus transmits information about the UE to network functions (NFs) or externally reports the information about the UE by being connected to the NFs in a 5G core network, for example, subscribes to a mobility management event of the UE, subscribes to a session management event of the UE, requests information related to a session, sets charging information of the UE, and requests to change a PDU session policy of the UE. 5G-RAM denotes a base station providing a wireless communication function to the UE. FIG. 1 illustrates an (R)AN. The UPF performs a function of a gateway for transmitting a packet transmitted and received by the UE. The UPF is connected to a DN to transmit a data packet generated in the 5G system to an external DN, and for example, may be connected to a DN connected via the Internet to route the data packet from the UE to the Internet.

According to an embodiment of the disclosure, a UE policy may include an access network discovery and selection policy (ANDSP) and a URSP. The ANDSP may denote a policy of the UE for selecting a non-3GPP access network (for example, a Wi-Fi network).

According to an embodiment of the disclosure, the URSP may be used to determine whether to associate traffic of an application detected by the UE with a pre-generated PDU session, offload the traffic to the non-3GPP access network outside the PDU session, or request to generate a new PDU session. Such URSP may include a service and session continuity mode selection policy, a network slice selection policy, a DNN selection policy, a non-seamless offloading policy, or an access type preference (preference for 3GPP or non-3GPP).

According to an embodiment of the disclosure, the UE policy (access network discovery and selection policy or URSP) may be pre-configured in the UE or configured by the PCF.

According to an embodiment of the disclosure, the PCF may distribute the UE policy when an initial registration procedure is performed, when the AMF for managing a location change of the UE or mobility of the UE is changed, or at a time determined by an operator. The UE policy may be divided into policy sections by the PCF and transmitted to the UE.

According to an embodiment of the disclosure, the UE may use a wireless local area network (WLAN) access network by registering in 5G core (5GC) via a non-3GPP interworking function (N3IWK).

According to an embodiment of the disclosure, when the WLAN access network is unable to be selected due to user preference, the UE may determine a most preferred WLAN access network by using a WLAN selection policy.

According to an embodiment of the disclosure, the ANDSP may include one or more WLAN selection policy (WLANSP) rules and one WLANSP may include a WLAN selection criterion and a condition where a WLANSP is valid. According to an embodiment of the disclosure, the condition where WLANSP is valid may be temporal or spatial region information where WLANSP is valid or network location information such as an operator or location area. Also, the WLAN selection criterion may include a preferred roaming partner list or information of a smallest backhaul threshold value.

According to an embodiment of the disclosure, the URSP may include URSP rules having an order of precedence. The URSP may be provided to the UE by a home operator.

According to an embodiment of the disclosure, the URSP rule may include information as Table 1 below.

TABLE 1

| Information Name | Description |
| --- | --- |
| Rule Precedence | Determine order of enforcing URSP rule in UE |
| Traffic Descriptor | Define traffic descriptor for UE policy |
| Application Identifier | Application identifier |
| IP Descriptor | Indicate IP 3 tuple. That is, indicate destination IPv4 address or IPv6 network prefix and destination port address and IP higher protocol ID. |
| Non-IP Descriptor | Descriptor for non-IP traffic |
| Route Selection Descriptor List | Route selection descriptor list (includes information described in Table 2) |

Referring to Table 1, an information name indicates a name of information included in the URSP rule and a description indicates description of each piece of information. For example, the URSP rule may include rule precedence, a traffic descriptor, and a route selection descriptor list. Also, the traffic descriptor may include an application identifier, an IP descriptor, or a non-IP descriptor.

According to an embodiment of the disclosure, the route selection descriptor may include information as Table 2 below.

TABLE 2

| Information Name | Description | Remark |
| --- | --- | --- |
| Route Selection Descriptor Precedence | Determine precedence of applying route selection descriptor | |
| Route Selection Components | Followings are included as route selection components | Note 1 |
| SSC Mode Selection | Include at least one SSC mode value | |
| Network Slice Selection | Include at least one S-NSSAI value | |
| DNN Selection | Include at least one DNN value | |
| Non-seamless Offloading Indicator | UE determines whether to apply non-seamless offloading regarding detected application conforming to rule | |
| Access Type Preference | Indicate preferred access type (i.e., 3GPP or non-3GPP) when UE generates PDU session for traffic of detected application conforming to rule | |

NOTE 1:
Route selection components should include at least one selection component from among SSC mode selection component, network slice selection component, DNN selection component, non-seamless offloading selection component, and access type preference selection component.

Referring to Table 2, an information name indicates a name of information included in a route selection descriptor and a description indicates description of each piece of information. For example, the route selection descriptor may include a route selection descriptor precedence and route selection components. Also, the route selection components may include SSC mode selection, network slice selection, DNN selection, a non-seamless offloading indicator, and an access type preference indicator.

According to an embodiment of the disclosure, an operation of the PCF transmitting the UE policy is as follows. For example, the PCF transmitting the UE policy may divide the UE policy into policy sections distinguished by different policy section identifiers (PSIs). The PCF may assign all URSPs to one policy section. Alternatively, the PCF may assign one or more URSP rules to one policy section. The PCF may determine whether to update the UE policy by transmitting the UE policy to the UE, by comparing a PSI list received from the UE and a PSI list to be installed in the UE. For example, when the PSI list to be installed in the UE includes more PSIs than the PSI list received from the UE, the PCF may transmit the UE policy to the UE and install a PSI that is not installed to determine whether to update the UE policy installed in the UE. Here, the PSI list to be installed in the UE may be pre-configured and stored in the PCF. According to an embodiment of the disclosure, when the PCF determines to update the UE policy by transmitting the UE policy to the UE, the PCF may transmit, to the UE, a PSI list to be updated and a details for each PSI. The PSI may be encoded by a UE policy section index (UPSI) and the UPSI may include an identifier of an operator who transmits the UE policy (for example, PLMN ID). In other words, a UPSI transmitted by the V-PCF of the visited network operator may include a visited PLMN ID, and a UPSI transmitted by the H-PCF of the home network operator may include a home PLMN ID. According to an embodiment of the disclosure, the visited PLMN ID or the home PLMN ID may denote an operator who generated a URSP or ANDSP rule associated with the UPSI.

According to an embodiment of the disclosure, the UE may transmit, to the PCF, a PSI list stored in the UE during an initial registration procedure. When there is no UE policy stored in the UE, the UE may not transmit the PSI list to the PCF. According to an embodiment of the disclosure, the PCF that transmits the PSI list stored in the UE may vary depending on whether the UE is roamed. For example, when the UE is not roamed, the UE may transmit the PSI list stored in the UE to the H-PCF. Alternatively, when the UE is roamed, the UE may transmit the PSI list stored in the UE to the V-PCF.

The UE may transmit UE policy information during the initial registration procedure to synchronize the UE policy. A procedure of transmitting the UE policy information to synchronize the UE policy may be performed in a case where there is no UE policy information when the UE is initially turned on or in a case where a universal subscriber identity module (USIM) is moved from one UE to another UE.

According to an embodiment of the disclosure, the UE may update the UE policy stored in the UE, based on the UE policy provided from the PCF, by using a method below.

For example, regarding the PSI transmitted from the PCF, when a policy for a same PSI is not present in the UE, the UE may store UE policy rules included in a policy section referred to by a new PSI. Alternatively, regarding the PSI transmitted from the PCF, when a UE policy section for a same PSI is present in the UE, the UE may replace the UE policy section present in the UE by a received UE policy section. Alternatively, when there is no content of information received from the PCF, the UE may delete a UE policy section for the stored PSI.

According to an embodiment of the disclosure, upon receiving the UE policy, the UE may verify accuracy of the received UE policy. For example, it may be verified whether UE policy section entries for the PSI list to be installed in the UE are all received, whether there is a missing element in a rule, or whether there are conflicting rules.

According to an embodiment of the disclosure, the UE may perform following procedures on an individual policy section entry for the PSI list to be installed.

When there is no policy for a corresponding PSI, the UE stores and installs a rule included in a policy section entry.

When there is a policy for a corresponding PSI, the UE replaces a rule included in a policy section entry.

According to an embodiment of the disclosure, the UE may delete a stored policy section entry when there is one, regarding a PSI list to be deleted. Alternatively, when a received policy section entry is empty, the UE may delete a rule regarding a corresponding PSI.

According to an embodiment of the disclosure, the UE may transmit a response message to the PCF via the AMF. After performing an operation suggested by the PCF regarding a policy section (for example, a procedure of updating the UE policy stored in the UE based on the UE policy provided from the PCF), the UE may transmit the installed PSI list to the PCF to fully understand the installed UE policy.

According to an embodiment of the disclosure, the PFC may transmit, to the UE, temporal and spatial conditions in which the UE policy transmitted to the UE is enforced according to requirements of an operator, by including the temporal and spatial conditions in a UE container. The temporal condition in which the UE policy is enforced may include following cases.

Immediate enforcement after installation
Enforcement within 1 hour after installation
Enforcement during UE rebooting after installation
Enforcement when entering airplane mode after installation
Enforcement when releasing airplane mode after installation
Enforcement during roaming mode after installation
Enforcement at absolute time (noon on 1 May 2018) after installation According to an embodiment of the disclosure, the spatial condition in which the UE policy determined as an access network is enforced may include following cases.

Enforcement when particular PLMN is shown after installation
Enforcement when particular air interface (for example, 5G NR, LTE, eLTE, 3G, or 2G) is detected after installation
Enforcement when voice over LTE (VoLTE) is available after installation
Enforcement when LADN DNN is discovered after installation
Enforcement when located at particular space determined via global positioning system (GPS) after installation
Enforcement when particular Wi-Fi service set identifier (SSID) is scanned after installation According to an embodiment of the disclosure, a home PLMN may denote a network in which the UE is set as a subscriber. A visited PLMN may denote a network in which the UE is currently registered.

Also, a H-PCF may denote a PCF included in the home PLMN and a V-PCF may denote a PCF included in the visited PLMN. Also, a H-URSP may denote a URSP configured by the home PLMN and a V-URSP may denote a URSP configured by the visited PLMN.

According to an embodiment of the disclosure, a UE policy container may include a plurality of policy sections. Also, a PSI and PLMN ID for distinguishing each policy section may be assigned to the plurality of policy sections. Each policy section may include a URSP rule corresponding thereto. According to an embodiment of the disclosure, the UE may identify a URSP rule included in a policy section to which a home PLMN ID is assigned as a H-URSP. Also, the UE may identify a URSP rule included in a policy section to which a visited PLMN ID is assigned as a V-URSP. In other words, the V-PCF and the H-PCF transmits the URSP by including the URSP in the UE policy container, and the UE may distinguish the URSP as the V-URSP or the H-URSP by referring to the PLMN ID or the like assigned to the policy section. Hereinafter, for convenience of description, the URSP configured by the visited PLMN will be referred to as the V-URSP and the URSP configured by the home PLMN will be referred to as the H-URSP.

FIG. 2 is a flowchart of a method by which a V-PCF transmits a V-URSP, according to an embodiment of the disclosure.

Referring to FIG. 2, in operation 201, the V-PCF may transmit, to a H-PCF, an indicator requesting transmission or allowance of transmission of the V-URSP of the V-PCF. According to an embodiment, the V-PCF may receive, from an AMF, the indicator requesting transmission or allowance of transmission of the V-URSP of the V-PCF and transmit a message including the received indicator to the H-PCF. For example, the indicator requesting transmission or allowance of transmission of the V-URSP of the V-PCF may be transmitted from the AMF to the V-PCF, based on an indicator allowing transmission of the V-URSP of the V-PCF transmitted from a UDM of a home PLMN. According to an embodiment of the disclosure, the indicator requesting transmission or allowance of transmission of the V-URSP of the V-PCF may be referred to as a V-URSP request indicator. Also, according to an embodiment of the disclosure, the indicator allowing transmission of the V-URSP of the V-PCF may be referred to as a V-URSP allowance indicator.

In operation 203, the V-PCF may receive an indicator indicating whether transmission of the V-URSP of the V-PCF is allowed. According to an embodiment of the disclosure, the H-PCF may determine whether to allow the transmission of the V-URSP of the V-PCF. The H-PCF may transmit, to the V-PCF, an indicator indicating whether the transmission of the V-URSP of the V-PCF is allowed, based on a result of the determining.

According to an embodiment of the disclosure, when the H-PCF allows the transmission of the V-URSP of the V-PCF, the H-PCF may transmit an indicator allowing the transmission of the V-URSP of the V-PCF to the V-PCF. According to an embodiment of the disclosure, when the H-PCF does not allow the transmission of the V-URSP of the V-PCF, the H-PCF may not transmit the indicator allowing the transmission of the V-URSP of the V-PCF to the V-PCF. Alternatively, the H-PCF may transmit, to the V-PCF, a message including an indicator indicating that the transmission of the V-URSP of the V-PCF is not allowed. According to an embodiment of the disclosure, the indicator allowing the transmission of the V-URSP of the V-PCF may be referred to as a V-URSP allowance indicator.

In operation 205, the V-PCF may receive the H-URSP. For example, the V-PCF may receive a message including the H-URSP from the H-PCF. Here, the message including the H-URSP may be referred to as a UE policy container. According to an embodiment of the disclosure, operation 205 may be performed at the same time as or after operation 203, and is not limited to an example shown in FIG. 2.

In operation 207, the V-PCF may transmit a message including at least one of the H-URSP or the V-URSP. For example, when the indicator allowing the transmission of the V-URSP of the V-PCF is received from the H-PCF, the V-PCF may transmit, to the AMF, a message including the H-URSP received from the H-PCF and the V-URSP. When the V-PCF does not receive the indicator allowing the transmission of the V-URSP of the V-PCF from the H-PCF or receives an indicator indicating that the transmission of the V-URSP of the V-PCF is not allowed, the V-PCF may transmit, to the AMF, a message including the H-URSP received from the H-PCF. According to an embodiment of the disclosure, a message transmitted by the V-PCF to the AMF may be referred to as a UE policy container. The AMF may transmit a message (for example, the UE policy container) received from the V-PCF to a UE.

FIG. 3 is a flowchart of a method by which a V-PCF transmits a precedence indicator related to a V-URSP, according to an embodiment of the disclosure.

Referring to FIG. 3, in operation 301, the V-PCF may transmit, to a H-PCF, an indicator requesting precedence of the V-URSP. According to an embodiment of the disclosure, the precedence of the V-URSP may indicate that the V-URSP has a higher order of precedence than a H-URSP while selecting a policy of a UE. According to an embodiment of the disclosure, operation 301 may be triggered based on a message including an indicator requesting transmission or allowance of transmission of the V-URSP of the V-PCF transmitted from an AMF or a notification message transmitted from a visited unified data repository (V-UDR) of a visited PLMN. According to an embodiment of the disclosure, the indicator requesting the precedence of the V-URSP may be referred to as a V-URSP precedence request.

In operation 303, the V-PCF may receive, from the H-PCF, information about a result of determining whether to allow the precedence of the V-URSP. According to an embodiment of the disclosure, the H-PCF may receive the indicator requesting the precedence of the V-URSP from the V-PCF and determine whether to allow the precedence of the V-URSP. For example, the H-PCF may determine whether to allow the precedence of the V-URSP, based on a policy of a home PLMN, subscription information of the UE, and a roaming agreement or SLA between the home PLMN and a visited PLMN. Then, the H-PCF may transmit, to the V-PCF, the information about the result of determining whether to allow the precedence of the V-URSP. For example, when the H-PCF allows the precedence of the V-URSP, the H-PCF may transmit information indicating allowance of the precedence of the V-URSP to the V-PCF. However, when the H-PCF does not allow the precedence of the V-URSP, the H-PCF may not transmit the information indicating allowance of the precedence of the V-URSP to the V-PCF. According to an embodiment of the disclosure, the information indicating allowance of the precedence of the V-URSP may be referred to as V-URSP precedence accept.

In operation 305, the V-PCF may receive, from the H-PCF, an indicator regarding the precedence of the V-URSP, based on determination of allowing the precedence of the V-URSP. As described with reference to operation 303, when the H-URSP determines to allow the precedence of the V-URSP, the H-PCF may transmit, to the V-PCF, the indicator regarding the precedence of the V-URSP. According to an embodiment of the disclosure, the indicator regarding the precedence of the V-URSP may be referred to as a V-URSP precedence indicator. According to an embodiment of the disclosure, operation 305 may be performed at the same time as or after operation 303, and is not limited to an example shown in FIG. 3.

In operation 307, the V-PCF may transmit a message including the indicator regarding the precedence of the V-URSP. For example, when the V-PCF receives the indicator regarding the precedence of the V-URSP from the H-PCF, the V-PCF may transmit, to the AMF, a message (a UE policy container) including the V-URSP, the H-URSP, and the indicator regarding precedence of the V-URSP. Then, the message (the UE policy container) may be received by the UE via the AMF. The UE may apply a higher order of precedence to the V-URSP than the H-URSP when selecting a policy by referring to the received message (the UE policy container).

Alternatively, when the V-PCF does not receive the indicator regarding the precedence of the V-URSP from the H-PCF, the V-PCF may transmit, to the AMF, a message (a UE policy container) including the V-URSP and the H-URSP. Then, the message (the UE policy container) may be received by the UE via the AMF. Because the message does not include the indicator regarding the precedence of the V-URSP, the V-PCF may not apply a higher order of precedence to the V-URSP than the H-URSP when selecting a policy. In other words, a higher order of precedence may be applied to the H-URSP than the V-URSP.

FIG. 4 is a flowchart of a method by which a H-PCF determines transmission of a V-URSP of a V-PCF, according to an embodiment of the disclosure.

Referring to FIG. 4, in operation 401, the H-PCF may receive, from the V-PCF, an indicator requesting transmission or allowance of transmission of the V-URSP of the V-PCF. According to an embodiment of the disclosure, the indicator requesting transmission or allowance of transmission of the V-URSP of the V-PCF may be transmitted from an AMF to the H-PCF via the V-PCF.

In operation 403, the H-PCF may determine whether to allow transmission of the V-URSP of the V-PCF, based on a pre-set criterion. For example, the pre-set criterion may include subscription information of a subscriber, an SLA relationship of a roaming operator, or a policy of an operator (a home network operator). It may be determined whether to allow transmission of the V-URSP of the V-PCF for each subscriber (or a subscribed UE), based on the pre-set criterion.

In operation 405, the H-PCF may transmit, to the V-PCF, an indicator indicating whether the transmission of the V-URSP of the V-PCF is allowed, based on the determination. For example, when the H-PCF allows the transmission of the V-URSP of the V-PCF, the H-PCF may transmit an indicator allowing the transmission of the V-URSP of the V-PCF to the V-PCF. According to an embodiment of the disclosure, when the H-PCF does not allow the transmission of the V-URSP of the V-PCF, the H-PCF may not transmit the indicator allowing the transmission of the V-URSP of the V-PCF to the V-PCF. Alternatively, the H-PCF may transmit, to the V-PCF, a message including an indicator indicating that the transmission of the V-URSP of the V-PCF is not allowed.

In operation 407, the H-PCF may transmit the H-URSP to the V-PCF. For example, the H-PCF may transmit, to the V-PCF, a UE policy container including the H-URSP. According to an embodiment of the disclosure, operation 407 may be performed at the same time as or after operation 405, and is not limited to an example shown in FIG. 4.

FIG. 5 is a flowchart of a method by which a H-PCF transmits a precedence indicator related to a V-URSP, according to an embodiment of the disclosure.

Referring to FIG. 5, in operation 501, the H-PCF may receive, from a V-PCF, an indicator requesting precedence of the V-URSP. For example, the V-PCF may transmit the indicator requesting precedence of the V-URSP, based on a message transmitted from an AMF or a message transmitted from a V-UDR. Then, the H-PCF may receive the indicator requesting precedence of the V-URSP from the V-PCF.

In operation 503, the H-PCF may determine whether to allow the precedence of the V-URSP, based on a policy of a home PLMN, subscription information of a UE, and a roaming agreement or SLA between the home PLMN and a visited PLMN. In other words, the H-PCF may determine whether to allow the precedence of the V-URSP, based on the above-described criteria.

In operation 505, the H-PCF may transmit, to the V-PCT, information about a result of determining whether to allow the precedence of the V-URSP. For example, when the H-PCF allows the precedence of the V-URSP, the H-PCF may transmit information indicating allowance of the precedence of the V-URSP to the V-PCF. However, when the H-PCF does not allow the precedence of the V-URSP, the H-PCF may not transmit the information indicating allowance of the precedence of the V-URSP to the V-PCF.

In operation 507, the V-PCF may transmit an indicator regarding the precedence of the V-URSP to the V-PCF. For example, as described with reference to operation 505, when the H-URSP determines to allow the precedence of the V-URSP, the H-PCF may transmit, to the V-PCF, the indicator regarding the precedence of the V-URSP. According to an embodiment of the disclosure, operation 407 may be performed at the same time as or after operation 505, and is not limited to an example shown in FIG. 5.

FIG. 6 is a flowchart of a method by which a UE selects a policy of the UE, according to an embodiment of the disclosure.

Referring to FIG. 6, in operation 601, the UE may receive a message including at least one of a H-URSP or a V-URSP from a V-PCF via an AMF. According to an embodiment of the disclosure, the message including at least one of the H-URSP or the V-URSP may denote a UE policy container transmitted from the V-PCF. According to an embodiment of the disclosure, the message including at least one of the H-URSP and the V-URSP may include a home PLMN ID or a visited PLMN ID. Also, the UE may verify whether a PLMN ID included in the message is the home PLMN ID or the visited PLMN ID. The UE may identify whether a network to which the UE registered is a visited network or a home network, based on a result of the verification.

In operation 603, the UE may identify whether the message includes an indicator regarding precedence of the V-URSP. According to an embodiment of the disclosure, the message transmitted from the V-PCF in operation 601 may include the indicator regarding precedence of the V-URSP. Here, the indicator regarding precedence of the V-URSP may be used while a policy of the UE is selected. According to an embodiment of the disclosure, the message transmitted from the V-PCF may include an indicator regarding the V-URSP. When the indicator regarding the V-URSP is verified in the message, the UE may identify a URSP included in the message as the V-URSP.

In operation 605, the UE may select the policy of the UE based on a result of the identification. For example, when the message transmitted from the V-PCF does not include the indicator regarding precedence of the V-URSP, the UE may select the policy of the UE based on the H-URSP. In other words, the UE may apply a higher order of precedence to the H-URSP than the V-URSP when selecting the policy. Alternatively, when the message transmitted from the V-PCF includes the indicator regarding precedence of the V-URSP, the UE may select the policy of the UE based on the V-URSP. In other words, the UE may apply a higher order of precedence to the V-URSP than the H-URSP when selecting the policy.

According to an embodiment of the disclosure, the UE may detect new traffic. Then, when the message transmitted from the V-PCF does not include the indicator regarding precedence of the V-URSP, the UE may verify whether the H-URSP corresponds to the new traffic. Next, the UE may verify whether the new traffic corresponds to the V-URSP, based on a result of the identification. Alternatively, when the message transmitted from the V-PCF includes the indicator regarding precedence of the V-URSP, the UE may verify whether the V-URSP corresponds to the new traffic. Next, the UE may verify whether the new traffic corresponds to the H-URSP, based on a result of the identification.

According to an embodiment of the disclosure, precedence may be set for each of the H-URSP and the V-URSP. In this case, the UE may assign an order of precedence of the V-URSP and the H-URSP, based on the indicator regarding precedence of the V-URSP. Also, the UE may select the policy of the UE based on the assigned order of precedence.

Hereinafter, FIGS. 7 through 9 show sequence diagrams of operating methods of a UE, AMF, V-PCF, and H-PCF for providing a policy of a UE, according to embodiments of the disclosure.

FIG. 7 is a sequence diagram of a method of transmitting a V-URSP, according to an embodiment of the disclosure. In particular, the embodiment of the disclosure of FIG. 7 relates to an allowance indicator of the V-URSP.

Referring to FIG. 7, a UE may transmit a registration request message for registration to an (R)AN. The (R)AN may select an AMF based on the received registration request message. Then, the (R)AN may transmit a registration request message to the selected AMF. The AMF may transmit an information request to a UDM of a home PLMN and receive a response to the information request, thereby receiving a V-URSP allowance indicator. Then, the AMF may transmit a message indicating registration allowance to the UE and the UE may transmit a response to the received message to the AMF. The V-URSP allowance indicator will now be described in detail.

According to an embodiment of the disclosure, in a roaming scenario, a home network (or home PLMN) operator may determine whether a visited network (visited PLMN) operator is to transmit a V-URSP to a UE. According to an embodiment of the disclosure, the H-PLMN operator may configure and store, in a UDM, a V-URSP allowance indicator for each UE or roaming operator.

According to an embodiment of the disclosure, the home network operator may determine whether to allow the V-URSP for each subscriber, according to subscription information of the subscriber, an SLA relationship with the roaming operator, or a policy of the home network operator. The "V-URSP allowance indicator" stored in a UDM/UDR of a home PLMN may indicate whether a V-PCF is to transmit the V-URSP to the UE.

According to an embodiment of the disclosure, during an initial access of the UE, the UDM of the home PLMN may receive an information request from an AMF of a visited PLMN (operation 4). Then, in response to the information request, the UDM of the home PLMN may transmit, to the AMF, the V-URSP allowance indicator stored in the UDM (operation 5). According to an embodiment of the disclosure, it may be determined whether the V-PCF is to transmit the V-URSP to the UE, based on the "V-URSP allowance indicator" stored in the UDM/UDR of the home PLMN. According to an embodiment of the disclosure, the UDM of the home PLMN may determine whether to include the "V-URSP allowance indicator" to a response message transmitted to the AMF, based on visited allowance, that is, whether the use of the V-URSP for the UE is allowed, determined in a subscription policy database of the UE, a roaming agreement between the visited PLMN and the home PLMN, or an operator policy of the home PLMN.

According to an embodiment of the disclosure, upon receiving the V-URSP allowance indicator, the AMF may also transmit a V-URSP request indicator to the V-PCF when the V-PCF is requested to create UE policy control. Here, the AMF may also transmit a registered PLMN ID (operation 8).

According to an embodiment of the disclosure, the V-PCF may store, for each UE, a PSI having a PLMN ID registered by a UE and a PSI having a PLMN ID provided by a current V-PCF, from among PSIs received from a visited UE.

According to an embodiment of the disclosure, the V-PCF may transmit, to the H-PCF, a request message inquiring whether to allow transmission of the V-URSP of the V-PCF, together with a V-URSP request indicator (operation 9).

According to an embodiment of the disclosure, the H-PCF may verify a policy for each UE or an SLA between operators, and determine whether to allow transmission of the V-URSP. When the H-PCF determines to allow transmission of the V-URSP, the H-PCF may transmit the V-URSP allowance indicator to the V-PCF (operation 10). And, V-PCF may forward the V-URSP allowance indicator to the AMF (operation 11). Then, the H-PCF may transmit a UE policy container including the H-URSP to the V-PCF (operation 12).

And, the V-PCF may transmit a message Npcf_UEPolicyControl_UpdateNotify in response to receiving the H-URSP (operation 13).

According to an embodiment of the disclosure, upon receiving the UE policy container from the H-PCF, the V-PCF may determine a policy section entry (PSE) to be provided to the UE or to be updated and generate a V-URSP rule stored in the V-UDR. In other words, the V-PCF may encode the V-URSP rule stored in the V-UDR in a form of a policy section for transmission to the UE.

According to an embodiment of the disclosure, when the V-PCF transmits the V-URSP request indicator in operation 9 and receives the V-URSP allowance indicator from the H-PCF in operation 10, the V-PCF may be allowed to transmit the V-URSP. When the V-PCF is allowed to transmit the V-URSP, the V-PCF may add the V-URSP to the UE policy container received from the H-PCF. Alternatively, the V-PCF may configure a separate UE policy container depending on a size and transmit the configured UE policy container to the AMF.

According to an embodiment of the disclosure, the V-PCF may determine to update UE policy procedures, based on a configured triggering condition. For example, the configured triggering condition may be when the UE registers to 5G system (5GS) while moving from an Evolved Packet switched System (EPS) to the 5GS or when a UE policy is required to be updated.

According to an embodiment of the disclosure, when the V-PCF determines to update the UE policy, the V-PCF may transmit a message Namf_Communication_N1N2Message to the AMF (operation 14). Here, a message transmitted to the AMF may include Subscription Permanent Identifier (SUPI) and the UE policy container.

According to an embodiment of the disclosure, the AMF may transparently transmit the UE policy container to the UE via a registered and reachable access (operation 15).

According to an embodiment of the disclosure, when the UE is in a CM-connected state via a 3GPP access or non-3GPP access, the AMF may transparently transmit the UE policy container received from the V-PCF to the UE (operation 16). According to an embodiment of the disclosure, the UE policy container may include information associated with UE access selection and PDU session selection related policy information.

According to an embodiment of the disclosure, the UE may update the UE policy provided from the V-PCF. Then, the UE may transmit a result of the update to the AMF (operation 17). In other words, the UE may transmit, to the AMF, information about the updated policy.

According to an embodiment of the disclosure, when the AMF receives the UE policy container and the V-PCF is subscribed to be notified of reception of the UE policy container, the AMF may transmit a response to the UE to the PCF (V-PCF or H-PCF) by using a message Namf_N1MessageNotify (operation 18).

For example, the V-PCF may transmit a message Npcf_UEPolicyControl_Update to the H-PCF (operation 19).

And, the H-PCF may transmit a message Npcf_UEPolicyControl_Update in response to receiving the Npcf_UEPolicyControl_Update message (operation 20).

According to an embodiment of the disclosure, the PCF (V-PCF or H-PCF) may maintain a latest PSI list transmitted to the UE and update the latest PSI list of UDR by invoking a Nudr_DM_Update service task (including SUPI, policy data, policy set item, and updated PSI data).

FIG. 8 is a sequence diagram of a method of transmitting a precedence indicator related to a V-URSP, according to an embodiment of the disclosure.

Referring to FIG. 8, according to a roaming scenario, a H-PCF of a home PLMN may provide, to a UE, an identifier (home PLMN ID) of an operator that provided a policy together with a URSP rule. When the home PLMN allows to transmit a URSP provided from a visited PLMN to the UE, a V-PCF of the visited PLMN may also provide a URSP rule to the UE.

According to an embodiment of the disclosure, the UE may verify a PLMN ID provided for each policy section. Then, the UE may consider a policy of a PLMN ID same as a currently registered PLMN ID as a policy of the visited PLMN.

According to an embodiment of the disclosure, when a UE policy container transmitted from the H-PCF of the home PLMN does not include a V-URSP precedence indicator, the URSP rule of the home PLMN received by the UE may have a higher order of precedence than the URSP rule transmitted from the visited PLMN.

According to an embodiment of the disclosure, the V-URSP precedence indicator may be an indicator indicating that the V-URSP rule has a higher order of precedence than the H-URSP rule. According to an embodiment of the disclosure, when the UE policy container or URSP rule received by the UE includes the V-URSP precedence indicator, the V-URSP provided by the V-PCF of the visited PLMN received by the UE may have a higher order of precedence than the H-URSP provided by the H-PCF of the home PLMN.

According to an embodiment of the disclosure, an AMF may transmit, to the V-PCF, a UE policy control create request message including a V-URSP request indicator (operation 1).

According to an embodiment of the disclosure, when transmitting the UE policy control create request message to the H-PCF, the V-PCF may transmit a V-URSP precedence request indicator (operation 2).

According to an embodiment of the disclosure, the H-PCF may determine precedence of the V-URSP. For example, the H-PCF may determine whether to allow the precedence of the V-URSP, based on a policy of a home PLMN, subscription information of the UE, and a roaming agreement or SLA between the home PLMN and the visited PLMN. According to an embodiment of the disclosure, when the H-PCF allows the precedence of V-URSP, the H-PCF may transmit, to the V-PCF, information related to allowance of the precedence the V-URSP (operation 3).

Then, the V-PCF may transmit a response message regarding the UE policy control create request message to the AMF (operation 4).

According to an embodiment of the disclosure, when the H-PCF allows the precedence of the V-URSP, the H-PCF may transmit, to the V-PCF, the V-URSP precedence indicator by including the V-URSP precedence indicator to the UE policy container in a UE policy control update notify message (operation 5).

According to an embodiment of the disclosure, the V-PCF may transmit, to the H-PCF, a response message regarding the UE policy control update notify message (operation 6).

According to an embodiment of the disclosure, when the received UE policy container includes the V-URSP allowance indicator described with reference to FIG. 7, the V-PCF may transmit, to the AMF, the V-URSP rule by including the V-URSP rule to the UE policy container.

According to an embodiment of the disclosure, the V-PCF may transmit, to the AMF, the UE policy container including the H-URSP, the V-URSP, the V-URSP precedence indicator, and the visited PLMN ID (operation 7).

Then, the V-PCF may transmit a message Npcf_UEPolicyControl_Update to the H-PCF (operation 8).

And, the H-PCF may transmit a message Npcf_UEPolicyControl_Update in response to receiving the Npcf_UEPolicyControl_Update message (operation 9).

FIG. 9 is a sequence diagram of a method of transmitting a precedence indicator related to a V-URSP, according to another embodiment of the disclosure.

Referring to FIG. 9, operations of FIG. 9 after operation 2 are the same as those described with reference to FIG. 8, except that only a triggering condition for a V-PCF transmitting a V-URSP precedence request message (operation 2) is different. For convenience of description, details overlapping those of FIG. 8 will be omitted.

According to an embodiment of the disclosure, a Npcf_UE Policy Control Update Request message transmitted by the V-PCF to a H-PCF may be triggered by an AMF or by a V-UDR. For example, the V-PCF may transmit a message of operation 2 after receiving a message including a V-URSP request indicator from the AMF. Alternatively, the V-PCF may transmit the message of operation 2 after receiving a notification message transmitted from the V-UDR. According to an embodiment of the disclosure, when a NEF of a visited network operator changed the V-UDR or an external application server requested to change a rule, the V-UDR may transmit a notification message related to a rule change to the V-PCF.

According to an embodiment of the disclosure, the V-URSP precedence indicator may be described as below.

According to an embodiment of the disclosure, a UE may determine whether a currently registered network is in a roaming state or not by using methods described in 1) to 6) below. According to an embodiment of the disclosure, when the UE is in the roaming state, the UE may identify whether a UE policy received via an AMF is a policy received from a visited PLMN or a policy received from a home PLMN.

1) The UE knows PLMN information of a home network in advance. For example, the PLMN information is stored in a USIM.

2) The UE knows a network registered by the UE. The UE verifies PLMN information broadcasted via a system information block (SIB) of a camped network, selects a serving PLMN via a PLMN selecting process, and transmits a PLMN ID requesting for registration in a radio resource control (RRC) message while performing a registration procedure.

3) When registration is successful, the AMF transmits, to the UE, a registered PLMN ID and an equivalent PLMN ID.

4) When the PLMN ID successful in registration and the equivalent PLMN ID are not a home PLMN ID, the UE determines a roaming situation. The registered PLMN ID and the equivalent PLMN ID are both considered as visited PLMN IDs.

5) It may be determined whether a PLMN ID in a UPSI received by the UE is a visited PLMN ID or a home PLMN ID.

6) The UE may verify whether PLMN ID information transmitted together with policy section information in a UE policy container received via a UE policy transmission procedure is home PLMN information known in advance, and determine whether the received UE policy is a policy received from the home PLMN or a policy received from the V-PCF of visited PLMN.

According to an embodiment of the disclosure, another method by which the UE determines a V-URSP may include displaying the V-URSP in a precedence item (precedence field) of an individual URSP rule. The method of displaying the V-URSP in the precedence item may include a method of including an indicator indicating a V-URSP for each URSP rule together with URSP rule precedence. A detailed example related to the above method may be described by a "Visited URSP Indicator" item of a URSP rule of Table 3 below.

TABLE 3

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Visited URSP indicator | Indicator whether this URSP rule is provided by Visited PLMN. The absence of this IE indicate the Home URSP. | Optional | Yes | UE Context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |

TABLE 3-continued

| Information name | Description | Category | PCF permitted to modify in a UE context | Scope |
|---|---|---|---|---|
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descripto rare described in table 6.6.2.1-3. | Mandatory | | |

NOTE 1:
Rules in a URSP shall have different precedence values.
NOTE 2:
The information is used to identify the Application(s) that is(are) running on the UE's OS. The OSId does not include an OS version number. The OSAppId does not include a version number for the application.
NOTE 3:
At least one of the Traffic descriptor components shall be present.
NOTE 4:
The format and some values of Connection Capabilities, e.g. "ims", "mms", "internet", etc., are defined in TS 24.526 [19]. More than one connection capabilities value can be provided.
NOTE 5:
A URSP rule cannot contain the combination of the Traffic descriptor components IP descriptors and Non-IP descriptors.

As in the example of Table 3, a V-URSP indicator may be included for each URSP rule and may include whether a corresponding URSP rule is provided by a V-PCF of a V-PLMN. Referring to the example of Table 3, the URSP rule not including the V-URSP indicator may denote a H-URSP rule provided by a H-PCF of a home PLMN.

According to an embodiment of the disclosure, an order of precedence of the V-URSP may be described as below.

According to an embodiment of the disclosure, a UE may determine whether the UE is currently roaming as below. For example, when a network registered during a registration procedure and the home PLMN stored in a USIM of the UE are different from each other, a roaming state may be determined. According to an embodiment of the disclosure, the UE may receive a UE policy via a UE policy transmission procedure. Also, the UE may verify a transmitted PLMN ID together with content of each policy section in a UE policy container, and determine whether a URSP is received from a visited network or from a home network. Here, the URSP received from the visited network may be referred to as a V-URSP.

According to an embodiment of the disclosure, when the UE received the URSP from both the visited PLMN and home PLMN, the URSP received from the home PLMN may have a higher order of precedence than the URSP received from the visited PLMN. In other words, all URSPs received from the home PLMN may always have a higher order of precedence than the URSP provided by the visited network. In other words, a URSP (excluding a match-all URSP) having a lowest order of precedence received from the home network may have a higher order of precedence than a URSP having a highest order of precedence provided from the visited network.

According to an embodiment of the disclosure, when the UE detected new traffic, the UE may verify all URSPs received from the home network and evaluate a visited URSP rule when there is no matching URSP rule. Then, the UE may verify a match-all URSP rule last.

According to an embodiment of the disclosure, as described with reference to FIGS. 8 and 9, when the UE received a V-URSP precedence indicator from the H-PCF, the UE may always apply a higher order of precedence to the URSP provided from the visited network than the URSP provided from the home network on the contrary. Table 4 below shows an example in which a URSP includes a V-URSP precedence indicator.

TABLE 4

| Information name | Description | Category | PCF permitted to modify in a URSP | Scope |
|---|---|---|---|---|
| URSP rules | 1 or more URSP rules as specified in table 6.6.2.1-2 | Mandatory | Yes | UE context |
| Visited URSP Precedence | Optional indicator whether visited URSP takes precedence. If present, the URSP rules provided by Visited PLMN take the precedence over URSP rules provided by Home PLMN. Otherwise, URSP rules provided by Home PLMN takes the precedence over URSP rules provided by Visited PLMN | Optional | Only Home PCF can add this IE. | UE context |

Referring to Table 4, when the URSP includes the V-URSP precedence indicator, a V-URSP may be processed before a H-URSP when a UE evaluates a URSP rule. Alternatively, when the URSP does not include the V-URSP precedence indicator but the UE received both the V-URSP and the H-URSP, the UE may apply the H-URSP before the V-URSP. In other words, when evaluating the URSP rule, the UE may process the H-URSP before the V-URSP.

FIG. 10 is a flowchart of an operating method of a UE that received a message related to a policy, according to an embodiment of the disclosure. According to an embodiment of the disclosure, the message related to a policy may denote a UE policy container.

Referring to FIG. 10, in operation 1001, the UE may receive the UE policy container. For example, the UE may receive the UE policy container from a H-PCF or V-PCF, or from the H-PCF and V-PCF.

In operation 1003, the UE may verify whether there is a V-URSP precedence indicator. That is, the UE may check whether there is a V-URSP precedence indicator. In other words, the UE may verify whether the received UE policy container includes the V-URSP precedence indicator.

In operation 1005, the UE may decode a policy section and extract a PLMN ID. For example, the UE may decode a policy section in the UE policy container and extract the PLMN ID included in a UPSI.

In operation 1007, the UE may determine whether each URSP rule is a V-URSP rule. Then, the UE may determine whether the URSP rule includes a match all traffic descriptor.

FIG. 11 is a flowchart of an operating method of a UE when new traffic is detected, according to an embodiment of the disclosure. According to an embodiment of the disclosure, FIG. 11 illustrates the operating method of the UE when the new traffic is detected after the UE received a UE policy container.

Referring to FIG. 11, in operation 1101, the UE may detect the new traffic.

In operation 1103, the UE may verify (or check) whether a V-URSP precedence indicator is received. When it is verified that the UE received the V-URSP precedence indicator, the UE may perform operations 1121 through 1129. Alternatively, when it is verified that the UE did not receive the V-URSP precedence indicator, the UE may perform operations 1105 through 1113.

In operation 1105, the UE may verify (or check) whether a H-URSP rule excluding a match all traffic descriptor matches new application traffic. When a matching URSP rule is present, the UE may apply the matching URSP rule in operation 1103. Alternatively, when there is no matching URSP rule, the UE may perform operation 1107.

In operation 1107, the UE may verify (or check) whether the V-URSP rule excluding the match all traffic descriptor matches the new application traffic. When a matching URSP rule is present, the UE may apply the matching URSP rule in operation 1103. Alternatively, when there is no matching URSP rule, the UE may perform operation 1109.

In operation 1109, the UE may verify (or check) whether there is a H-URSP rule with the match all traffic descriptor. When there is the H-URSP rule with the match all traffic descriptor, the UE may apply the corresponding URSP rule in operation 1113. Alternatively, when there is no H-URSP rule with the match all traffic descriptor, the UE may perform operation 1109.

In operation 1111, the UE may verify (or check) whether there is a V-URSP rule with the match all traffic descriptor. When there is the V-URSP rule with the match all traffic descriptor, the UE may apply the corresponding URSP rule in operation 1113. When there is no V-URSP rule with the match all traffic descriptor, the UE may apply an arbitrary URSP rule regardless of the matching and end the operation.

According to an embodiment of the disclosure, when the UE received the V-URSP precedence indicator, the UE may verify whether the V-URSP rule excluding the match all traffic descriptor matches the new application traffic in operation 1121. When a matching URSP rule is present, the UE may apply the matching URSP rule in operation 1129. Alternatively, when there is no matching URSP rule, the UE may perform operation 1123.

In operation 1123, the UE may verify (or check) whether the H-URSP rule excluding the match all traffic descriptor matches the new application traffic. When a matching URSP rule is present, the UE may apply the matching URSP rule in operation 1129. Alternatively, when there is no matching URSP rule, the UE may perform operation 1125.

In operation 1125, the UE may verify (or check) whether there is a V-URSP rule with the match all traffic descriptor. When there is the V-URSP rule with the match all traffic descriptor, the UE may apply the corresponding URSP rule in operation 1129. Alternatively, when there is no V-URSP rule with the match all traffic descriptor, the UE may perform operation 1127.

In operation 1127, the UE may verify (or check) whether there is a H-URSP rule with the match all traffic descriptor. When there is the H-URSP rule with the match all traffic descriptor, the UE may apply the corresponding URSP rule in operation 1129. When there is no H-URSP rule with the match all traffic descriptor, the UE may apply an arbitrary URSP rule regardless of the matching and end the operation.

According to an embodiment of the disclosure, a method of determining an order of precedence of V-URSP according to a URSP rule may be described as below.

According to an embodiment of the disclosure, while evaluating a URSP rule, a UE may align a V-URSP and a H-URSP in an order of precedence to apply the URSP rule in an order. When the orders of precedence are the same, the UE may apply the V-URSP rule later than the H-URSP rule.

According to an embodiment of the disclosure, when there is a V-URSP precedence indicator, the UE may apply the V-URSP rule before the H-URSP rule regarding a URSP rule having the same precedence. Table 5 below shows an example in which a URSP rule includes a V-URSP precedence indicator.

TABLE 5

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Visited URSP precedence indicator | For this particular URSP rule, the Visited URSP takes precedence over Home URSP. Absense of this IE indicator Home URSP rule takes precedence over Visited URSP | Optional | Yes | UE Context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |

TABLE 5-continued

| Information name | Description | Category | PCF permitted to modify in a UE context | Scope |
| --- | --- | --- | --- | --- |
| List of Route Selection Descriptors | A list of Route Selection Descriptors. The components of a Route Selection Descriptor are described in table 6.6.2.1-3. | Mandatory | | |

NOTE 1:
Rules in a URSP shall have different precedence values.
NOTE 2:
The information is used to identify the Application(s) that is(are) running on the UE's OS. The OSId does not include an OS version number. The OSAppId does not include a version number for the application.
NOTE 3:
At least one of the Traffic descriptor components shall be present.
NOTE 4:
The format and some values of Connection Capabilities, e.g. "ims", "mms", "internet", etc., are defined in TS 24.526 [19]. More than one connection capabilities value can be provided.
NOTE 5:
A URSP rule cannot contain the combination of the Traffic descriptor components IP descriptors and Non-IP descriptors.

Referring to Table 5, the URSP rule may include the V-URSP precedence indicator. Also, the UE may differently determine orders or precedence of application of H-URSP rule and V-URSP rule depending on whether the V-URSP precedence indicator is included.

FIG. 12 is a flowchart of an operating method of a UE that received a message related to a policy, according to an embodiment of the disclosure. According to an embodiment of the disclosure, the message related to a policy may denote a UE policy container.

Referring to FIG. 12, in operation 1201, the UE may receive the UE policy container. For example, the UE may receive the UE policy container from a H-PCF or V-PCF, or from the H-PCF and V-PCF.

In operation 1203, the UE may verify (or check) whether there is a V-URSP precedence indicator. In other words, the UE may verify whether the received UE policy container includes the V-URSP precedence indicator.

In operation 1105, the UE may decode a policy section and extract a PLMN ID. For example, the UE may decode a policy section in the UE policy container and extract the PLMN ID included in a UPSI.

In operation 1207, the UE may determine whether each URSP rule is a V-URSP rule. Then, the UE may determine whether the URSP rule includes a match all traffic descriptor.

In operation 1209, the UE may determine orders of precedence of the V-URSP rule and the H-URSP rule in consideration of the V-URSP precedence indicator. In other words, the UE may determine the orders of precedence of V-URSP and H-URSP rules, based on whether the V-URSP precedence indicator is received.

FIG. 13 is a flowchart of an operating method of a UE when new traffic is detected, according to an embodiment of the disclosure. According to an embodiment of the disclosure, FIG. 13 illustrates the operating method of the UE when the new traffic is detected after the UE received a UE policy container.

Referring to FIG. 13, in operation 1301, the UE may detect the new traffic.

In operation 1303, the UE may determine an order of precedence in consideration of a V-URSP precedence indicator. For example, the UE may determine orders of precedence of URSPs, based on whether the V-URSP precedence indicator is received. According to an embodiment of the disclosure, the UE may align URSP rules to be applied, based on the determined orders of precedence.

In operation 1305, the UE may verify (or check) application of V-URSP rules and H-URSP rules excluding a URSP including a match all traffic descriptor. When a matching URSP rule is present, the UE may apply the matching URSP rule. For example, the UE may associate application traffic to the matching URSP rule. Alternatively, when there is no matching URSP rule, the UE may perform operation 1307.

In operation 1307, the UE may verify whether a URSP rule with the match all traffic descriptor is matched. When the URSP rule with the match all traffic descriptor is matched, the UE may apply the matching URSP rule, in operation 1309. For example, the UE may associate the application traffic to the matching URSP rule with the match all traffic descriptor. When there is no matching URSP rule, the UE may apply an arbitrary URSP rule regardless of the matching and end an operation.

FIG. 14 is a block diagram of a configuration of a UE, according to an embodiment of the disclosure.

As shown in FIG. 14, the UE according to an embodiment of the disclosure may include a processor 1430, a transceiver 1410, and a memory 1420. However, the components of the UE are not limited thereto. For example, the UE may include more or fewer components than those described above. In addition, the processor 1430, the transceiver 1410, and the memory 1420 may be implemented as a single chip.

According to an embodiment of the disclosure, the processor 1430 may control a series of processes for the UE to operate according to an embodiment of the disclosure. For example, the processor 1430 may control the components of the UE to provide a policy for processing traffic of the UE in a wireless communication system according to an embodiment of the disclosure. There may be a plurality of the processors 1430 and the processor 1430 may execute a program stored in the memory 1420 to perform an operation of providing a policy for processing traffic of the UE as described above.

The transceiver 1410 may transmit or receive a signal to or from a base station. The signal transmitted or received to or from the base station may include control information and data. The transceiver 1410 may include a RF transmitter for up-converting and amplifying a frequency of a transmitted signal, and a RF receiver for amplifying low-noise and down-converting a frequency of a received signal. However, this is only an embodiment of the disclosure of the transceiver 1410 and components of the transceiver 1410 are not limited to the RF transmitter and the RF receiver. Also, the transceiver 1410 may receive and output, to the processor 1430, a signal through a wireless channel, and transmit a signal output from the processor 1430 through the wireless channel.

According to an embodiment of the disclosure, the memory 1420 may store a program and data required for operations of the terminal. Also, the memory 1420 may store the control information or data included in the signal transmitted and received by the terminal. The memory 1420 may be a storage medium, such as read-only memory (ROM), random access memory (RAM), a hard disk, a CD-ROM, and a DVD, or a combination of storage media. There may be a plurality of the memories 1420. According to an embodiment of the disclosure, the memory 1420 may store a program for performing an operation of providing a policy for processing traffic of the UE in the wireless communication system as described above.

FIG. 15 is a block diagram of a configuration of a core network entity, according to an embodiment of the disclosure.

Terms such as "unit" and "module" described below denote a unit that processes at least one function or operation, which may be implemented in hardware or software, or implemented in a combination of hardware and software. According to an embodiment of the disclosure, the core network entity may include a PCF (V-PCF or H-PCF) and an AMF.

Referring to FIG. 15, the core network entity may include a transceiver 1510, a memory 1520, and a processor 1530.

The transceiver 1510 may provide an interface for performing communication with other devices in a network. In other words, the transceiver 1510 converts a bit string transmitted from the core network entity to another device into a physical signal and converts a physical signal received from another device into a bit string. In other words, the transceiver 1510 may transmit or receive a signal. In this regard, the transceiver 1510 may be referred to as a modem, a transmitter, a receiver, a communication unit, or a communication module. Here, the transceiver 1510 enables the core network entity to communicate with the other devices or system via backhaul connection (for example, wired backhaul or wireless backhaul) or another connection method.

The memory 1520 may store data for operations of the core network entity, e.g., basic programs, application programs, and configuration information. The memory 1520 may be configured in a volatile memory, a nonvolatile memory, or a combination of a volatile memory and a nonvolatile memory. Also, the memory 1520 may provide the stored data upon request by the processor 1530.

The processor 1530 may control overall operations of the core network entity. For example, the processor 1530 may transmit and receive signals via the transceiver 1510. Also, the processor 1530 may record and read data on and from the memory 1520. In this regard, the processor 1530 may include at least one processor. The processor 1530 may control the core network entity to perform operations according to various embodiments of the disclosure described above. For example, the processor 1530 may control components of the core network entity to perform a method of providing a policy of a UE in a wireless communication system, according to an embodiment of the disclosure.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the disclosure, the term 'computer program product' or 'computer-readable medium' is used to entirely refer to a medium such as a memory, a hard disk installed in a hard disk drive, or a signal. The 'computer program product' or 'computer-readable medium' is used to provide a method of providing a policy of a UE in a wireless communication system, according to an embodiment of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure provide an apparatus and method for effectively providing a policy of a UE in a wireless communication system.

Meanwhile, specific embodiments of the disclosure have been described in the detailed description of the disclosure, but various modifications may be possible without departing from the scope of the disclosure. Therefore, the scope of the disclosure should not be limited to the embodiments of the disclosure described above, but should be determined not only by the scope of the following claims, but also by the equivalents of the claims.

The invention claimed is:

1. An operating method of a visited-policy control function (V-PCF) of a visited public land mobile network (PLMN) providing a policy for processing traffic of a user equipment in a wireless communication system, the operating method comprising:
    transmitting an indicator requesting transmission or allowance of transmission of a visited user equipment route selection policy (V-URSP) of the V-PCF to a home-policy control function (H-PCF) of a home PLMN;
    receiving, from the H-PCF, an indicator indicating whether transmission of the V-URSP of the V-PCF is allowed;
    receiving a home user equipment route selection policy (H-URSP) from the H-PCF; and
    transmitting, to the user equipment via an access and mobility management function (AMF), a message including at least one of the H-URSP or the V-URSP, based on the indicator indicating whether the transmission of the V-URSP of the V-PCF is allowed.

2. The operating method of claim 1, wherein the indicator requesting transmission or allowance of transmission of the V-URSP of the V-PCF is transmitted from the AMF to the V-PCF, based on an indicator allowing the transmission of the V-URSP of the V-PCF, and the indicator allowing the transmission of the V-URSP of the V-PCF is transmitted to the AMF from unified data management (UDM) of the home PLMN.

3. The operating method of claim 1, wherein the transmitting of the indicator requesting transmission or allowance of transmission of the V-URSP of the V-PCF to the H-PCF of the home PLMN comprises transmitting, to the H-PCF, an indicator requesting precedence of the V-URSP,
wherein the precedence of the V-URSP indicates that the V-URSP has a higher order of precedence than the H-URSP when a policy of the user equipment is selected.

4. The operating method of claim 1, wherein the transmitting of the indicator requesting transmission or allowance of transmission of the V-URSP of the V-PCF to the H-PCF of the home PLMN is triggered by a message including the indicator requesting transmission or allowance of transmission of the V-URSP of the V-PCF transmitted from the AMF or a notification message transmitted from a visited unified data repository (V-UDR) of the visited PLMN.

5. An operating method of a home-policy control function (H-PCF) of a home public land mobile network (PLMN) providing a policy for processing traffic of a user equipment in a wireless communication system, the operating method comprising:
receiving, from a visited-PCF (V-PCF) of a visited PLMN, an indicator requesting transmission or allowance of transmission of a visited user equipment route selection policy (V-URSP) of the V-PCF;
determining, based on a pre-set criterion, whether to allow transmission of the V-URSP of the V-PCF;
transmitting, to the V-PCF, an indicator indicating whether the transmission of the V-URSP of the V-PCF is allowed, based on a result of the determining; and
transmitting a home-URSP (H-URSP) to the V-PCF.

6. The operating method of claim 5, wherein the receiving, from the V-PCF of the visited PLMN, of the indicator requesting transmission or allowance of transmission of the V-URSP of the V-PCF comprises receiving, from the V-PCF, an indicator requesting precedence of the V-URSP,
wherein the precedence of the V-URSP indicates that the V-URSP has a higher order of precedence than the H-URSP when a policy of the user equipment is selected.

7. The operating method of claim 6, further comprising determining whether to allow the precedence of the V-URSP, based on a policy of the home PLMN, subscription information of the user equipment, a roaming agreement between the home PLMN and the visited PLMN, or a service level agreement, in response to the receiving of the indicator requesting the precedence of the V-URSP,
wherein the transmitting, to the V-PCF, of the indicator indicating whether the transmission of the V-URSP of the V-PCF is allowed comprises transmitting, to the V-PCF, information about a result of the determining of whether to allow the precedence of the V-URSP.

8. The operating method of claim 7, wherein the transmitting of the H-URSP to the V-PCF comprises transmitting, to the V-PCF, an indicator regarding the precedence of the V-URSP, based on the determination that the precedence of the V-URSP is allowed.

9. An operating method of a user equipment for providing a policy for processing traffic of the user equipment in a wireless communication system, the operating method comprising:
receiving a message including at least one of home user equipment route selection policy (H-URSP) or a visited-URSP (V-URSP) from a visited-policy control function (V-PCF) of a visited public land mobile network (PLMN) via a mobility management function (AMF);
checking whether the message comprises an indicator regarding precedence of the V-URSP; and
selecting a policy of the user equipment based on a result of the checking,
wherein the precedence of the V-URSP indicates that the V-URSP has a higher order of precedence than the H-URSP when a policy of the user equipment is selected.

10. The operating method of claim 9, further comprising:
checking whether PLMN identification (ID) included in the message is home PLMN ID or visited PLMN ID, based on information about the home PLMN ID pre-set in the user equipment; and
identifying whether a network where the user equipment is registered is a visited network or a home network, based on a result of the checking.

11. The operating method of claim 9, further comprising:
checking an indicator regarding the V-URSP included in the message; and
identifying a URSP included in the message as the V-URSP, based on the checking of the indicator regarding the V-URSP.

12. The operating method of claim 9, wherein the selecting of the policy of the user equipment based on the result of the checking comprises:
selecting the policy of the user equipment based on the H-URSP, when the message does not include the indicator regarding the precedence of the V-URSP; and
selecting the policy of the user equipment based on the V-URSP when the message includes the indicator regarding the precedence of the V-URSP.

13. The operating method of claim 9, further comprising detecting new traffic,
wherein the selecting of the policy of the user equipment based on the result of the verifying comprises:
checking whether the H-URSP corresponds to the new traffic when the message does not include the indicator regarding the precedence of the V-URSP; and
checking whether the V-URSP corresponds to the new traffic based on a result of checking whether the H-URSP corresponds to the new traffic.

14. The operating method of claim 9, further comprising detecting new traffic,
wherein the selecting of the policy of the user equipment based on the result of the checking comprises:
checking whether the V-URSP corresponds to the new traffic when the message includes the indicator regarding the precedence of the V-URSP; and
checking whether the H-URSP corresponds to the new traffic based on a result of checking whether the V-URSP corresponds to the new traffic.

15. The operating method of claim 9, wherein the selecting of the policy of the user equipment based on the result of the checking comprises, when precedence is set for each of the H-URSP and the V-URSP:
assigning an order of precedence of the V-URSP and the H-URSP, based on the indicator regarding precedence of the V-URSP; and
selecting the policy of the user equipment based on the order of precedence.

* * * * *